(12) United States Patent
Tong et al.

(10) Patent No.: US 12,521,208 B2
(45) Date of Patent: Jan. 13, 2026

(54) ORTHODONTIC APPLIANCE WITH NON-SLIDING, TIED ARCHWIRE

(71) Applicant: Lorelli Technologies LLC, N. Babylon, NY (US)

(72) Inventors: Hongsheng Tong, Yorba Linda, CA (US); Robert Lee, Torrance, CA (US); Philong John Pham, Huntington Beach, CA (US); W. Ronald Redmond, San Clemente, CA (US)

(73) Assignee: Lorelli Technologies LLC, N. Babylon, NY (US)

( * ) Notice: Subject to any disclaimer, the term of this patent is extended or adjusted under 35 U.S.C. 154(b) by 431 days.

(21) Appl. No.: 17/302,314

(22) Filed: Apr. 29, 2021

(65) Prior Publication Data

US 2021/0244505 A1   Aug. 12, 2021

Related U.S. Application Data

(63) Continuation of application No. 15/490,278, filed on Apr. 18, 2017, now abandoned.
(Continued)

(51) Int. Cl.
*A61C 7/12* (2006.01)
*A61C 7/14* (2006.01)
(Continued)

(52) U.S. Cl.
CPC ............... *A61C 7/12* (2013.01); *A61C 7/28* (2013.01); *A61C 7/14* (2013.01); *A61C 7/20* (2013.01)

(58) Field of Classification Search
CPC .. A61C 7/12; A61C 7/14; A61C 7/141; A61C 7/143; A61C 7/145; A61C 7/20; A61C 7/28
See application file for complete search history.

(56) References Cited

U.S. PATENT DOCUMENTS

| 1,005,131 A | 10/1911 | Angle et al. |
| 1,108,493 A | 8/1914 | Federspiel |

(Continued)

FOREIGN PATENT DOCUMENTS

| CN | 1372872 | 10/2002 |
| CN | 201079455 | 7/2008 |

(Continued)

OTHER PUBLICATIONS

Coro, Jorge C. et al., "MEAW Therapy" MEAW Therapy-Orthodontic Products, accessed via http://www.orthodonticproductsonline.com/2012/11/meaw-therapy/ on Mar. 14, 2016, published Nov. 12, 2012 in 6 pages.
(Continued)

*Primary Examiner* — Heidi M Eide
*Assistant Examiner* — Holly T. To
(74) *Attorney, Agent, or Firm* — Knobbe, Martens, Olson & Bear, LLP

(57) ABSTRACT

An orthodontic appliance can include an archwire, ties, and multiple orthodontic brackets. The archwire can include multiple male fasteners and interproximal loops. Each male fastener may be inserted into an orthodontic bracket and tied into place. The male fastener may not be able to slide relative to the orthodontic bracket after it is tied to the orthodontic bracket.

15 Claims, 7 Drawing Sheets

Related U.S. Application Data

(60) Provisional application No. 62/324,265, filed on Apr. 18, 2016.

(51) Int. Cl.
  *A61C 7/20* (2006.01)
  *A61C 7/28* (2006.01)

(56) References Cited

U.S. PATENT DOCUMENTS

| | | | |
|---|---|---|---|
| 1,307,382 A | 6/1919 | Stanton | |
| 1,323,141 A | 11/1919 | Young | |
| 1,429,749 A | 9/1922 | Maeulen et al. | |
| 1,638,006 A | 8/1927 | Aderer | |
| 2,257,069 A | 9/1941 | Peak | |
| 2,495,692 A | 1/1950 | Brusse | |
| 2,524,763 A | 10/1950 | Brusse | |
| 2,582,230 A | 1/1952 | Brusse | |
| 3,256,602 A | 6/1966 | Broussard | |
| 3,262,207 A | 7/1966 | Kesling | |
| 3,374,542 A | 3/1968 | Moylan, Jr. | |
| 3,464,113 A | 9/1969 | Silverman et al. | |
| 3,593,421 A | 7/1971 | Brader | |
| 3,600,808 A | 8/1971 | Reeve | |
| 3,683,502 A | 8/1972 | Wallshein | |
| 3,691,635 A | 9/1972 | Wallshein | |
| 3,762,050 A | 10/1973 | Dal Pont | |
| 3,765,091 A | 10/1973 | Northcutt | |
| 3,878,610 A | 4/1975 | Coscina | |
| 3,936,938 A | 2/1976 | Northcutt | |
| 3,946,488 A | 3/1976 | Miller et al. | |
| 3,949,477 A | 4/1976 | Cohen et al. | |
| 3,975,823 A | 8/1976 | Sosnay | |
| 4,052,792 A * | 10/1977 | Biederman | A61C 7/12 433/8 |
| 4,103,423 A | 8/1978 | Kessel | |
| 4,171,568 A | 10/1979 | Forster | |
| 4,192,070 A | 3/1980 | Lemchen et al. | |
| 4,193,195 A | 3/1980 | Merkel et al. | |
| 4,197,643 A | 4/1980 | Burstone et al. | |
| 4,268,250 A | 5/1981 | Reeve | |
| 4,330,273 A | 5/1982 | Kesling | |
| 4,354,833 A | 10/1982 | Fujita | |
| 4,354,834 A | 10/1982 | Wilson | |
| 4,382,781 A | 5/1983 | Grossman | |
| 4,385,890 A | 5/1983 | Klein | |
| 4,412,819 A | 11/1983 | Cannon | |
| 4,416,627 A * | 11/1983 | Beazley | A61C 7/12 433/17 |
| 4,424,033 A | 1/1984 | Wool | |
| 4,436,510 A | 3/1984 | Klein | |
| 4,479,779 A | 10/1984 | Wool | |
| 4,483,674 A | 11/1984 | Schütz | |
| 4,490,112 A | 12/1984 | Tanaka et al. | |
| 4,501,554 A | 2/1985 | Hickham | |
| 4,516,938 A | 5/1985 | Hall | |
| 4,529,382 A * | 7/1985 | Creekmore | A61C 7/12 433/9 |
| 4,533,320 A | 8/1985 | Piekarsky | |
| 4,561,844 A | 12/1985 | Bates | |
| 4,580,976 A | 4/1986 | O'Meara | |
| 4,582,487 A | 4/1986 | Creekmore | |
| 4,585,414 A | 4/1986 | Kottermann | |
| 4,592,725 A | 6/1986 | Goshgarian | |
| 4,634,662 A | 1/1987 | Rosenberg | |
| 4,656,860 A | 4/1987 | Orthuber et al. | |
| 4,659,310 A | 4/1987 | Kottermann | |
| 4,664,626 A | 5/1987 | Kesling | |
| 4,674,978 A | 6/1987 | Acevedo | |
| 4,676,747 A | 6/1987 | Kesling | |
| 4,725,229 A | 2/1988 | Miller | |
| 4,797,093 A | 1/1989 | Bergersen | |
| 4,797,095 A | 1/1989 | Armstrong et al. | |
| 4,838,787 A | 6/1989 | Lerner | |
| 4,842,512 A * | 6/1989 | Kesling | A61C 7/12 433/8 |
| 4,842,514 A * | 6/1989 | Kesling | A61C 7/12 433/21 |
| 4,872,449 A | 10/1989 | Beeuwkes | |
| 4,881,896 A | 11/1989 | Bergersen | |
| 4,892,479 A | 1/1990 | McKenna | |
| 4,897,035 A | 1/1990 | Green | |
| 4,900,251 A | 2/1990 | Andreasen | |
| 4,941,825 A * | 7/1990 | Lerner | A61C 7/287 433/14 |
| 4,978,323 A | 12/1990 | Freedman | |
| 5,011,405 A | 4/1991 | Lemchen | |
| 5,017,133 A | 5/1991 | Miura | |
| 5,037,297 A * | 8/1991 | Lerner | A61C 7/143 433/14 |
| 5,044,947 A | 9/1991 | Sachdeva et al. | |
| 5,055,039 A | 10/1991 | Abbatte et al. | |
| 5,092,768 A | 3/1992 | Korn | |
| 5,114,339 A | 5/1992 | Guis | |
| 5,123,838 A | 6/1992 | Cannon | |
| 5,127,828 A | 7/1992 | Suyama | |
| 5,131,843 A | 7/1992 | Hilgers et al. | |
| 5,154,606 A | 10/1992 | Wildman | |
| 5,174,754 A | 12/1992 | Meritt | |
| 5,176,514 A | 1/1993 | Viazis | |
| 5,176,618 A | 1/1993 | Freedman | |
| 5,238,404 A | 8/1993 | Andreiko | |
| 5,242,304 A | 9/1993 | Truax et al. | |
| 5,248,257 A | 9/1993 | Cannon | |
| 5,259,760 A | 11/1993 | Orikasa | |
| 5,312,247 A | 5/1994 | Sachdeva et al. | |
| 5,344,315 A | 9/1994 | Hanson | |
| 5,368,478 A | 11/1994 | Andreiko | |
| 5,380,197 A | 1/1995 | Hanson | |
| 5,399,087 A | 3/1995 | Arndt | |
| 5,431,562 A | 7/1995 | Andreiko | |
| 5,447,432 A | 9/1995 | Andreiko | |
| 5,454,717 A | 10/1995 | Andreiko | |
| RE35,169 E | 3/1996 | Lemchen et al. | |
| 5,516,284 A | 5/1996 | Wildman | |
| 5,556,277 A | 9/1996 | Yawata et al. | |
| 5,624,258 A | 4/1997 | Wool | |
| 5,630,715 A | 5/1997 | Voudouris | |
| 5,683,243 A | 11/1997 | Andreiko | |
| 5,683,245 A | 11/1997 | Sachdeva et al. | |
| 5,722,827 A | 3/1998 | Allesee | |
| 5,727,941 A | 3/1998 | Kesling | |
| 5,816,800 A | 10/1998 | Brehm | |
| 5,820,370 A | 10/1998 | Brosius | |
| 5,863,198 A | 1/1999 | Doyle | |
| 5,890,893 A | 4/1999 | Heiser | |
| 5,971,754 A | 10/1999 | Sondhi et al. | |
| 5,975,893 A | 11/1999 | Chishti et al. | |
| 5,993,208 A | 11/1999 | Jonjic | |
| 6,015,289 A | 1/2000 | Andreiko | |
| 6,036,489 A | 3/2000 | Brosius | |
| 6,042,374 A | 3/2000 | Farzin-Nia et al. | |
| 6,086,364 A | 7/2000 | Brunson | |
| 6,089,861 A | 7/2000 | Kelly | |
| 6,095,809 A | 8/2000 | Kelly et al. | |
| 6,099,304 A | 8/2000 | Carter | |
| 6,123,544 A | 9/2000 | Cleary | |
| 6,183,250 B1 | 2/2001 | Kanno et al. | |
| 6,190,166 B1 | 2/2001 | Sasakura | |
| 6,196,839 B1 | 3/2001 | Ross | |
| 6,213,767 B1 | 4/2001 | Dixon et al. | |
| 6,217,325 B1 | 4/2001 | Chishti et al. | |
| 6,227,850 B1 | 5/2001 | Chishti et al. | |
| 6,244,861 B1 | 6/2001 | Andreiko | |
| 6,250,918 B1 | 6/2001 | Sachdeva et al. | |
| 6,258,118 B1 | 7/2001 | Baum et al. | |
| 6,315,553 B1 | 11/2001 | Sachdeva et al. | |
| 6,318,994 B1 | 11/2001 | Chishti et al. | |
| 6,318,995 B1 | 11/2001 | Sachdeva et al. | |
| 6,334,853 B1 | 1/2002 | Kopelman et al. | |
| 6,350,120 B1 | 2/2002 | Sachdeva et al. | |
| 6,358,045 B1 | 3/2002 | Farzin-Nia et al. | |
| 6,371,761 B1 | 4/2002 | Cheang et al. | |

(56) References Cited

U.S. PATENT DOCUMENTS

| | | |
|---|---|---|
| 6,375,458 B1 | 4/2002 | Moorleghem et al. |
| 6,394,801 B2 | 5/2002 | Chishti et al. |
| 6,398,548 B1 | 6/2002 | Muhammad et al. |
| 6,413,084 B1 | 7/2002 | Rubbert et al. |
| 6,431,870 B1 | 8/2002 | Sachdeva |
| 6,450,807 B1 | 9/2002 | Chishti et al. |
| 6,464,495 B1 | 10/2002 | Voudouris |
| 6,464,496 B1 | 10/2002 | Sachdeva et al. |
| 6,471,511 B1 | 10/2002 | Chishti et al. |
| 6,471,512 B1 | 10/2002 | Sachdeva et al. |
| 6,512,994 B1 | 1/2003 | Sachdeva |
| 6,514,074 B1 | 2/2003 | Chishti et al. |
| 6,532,299 B1 | 3/2003 | Sachdeva et al. |
| 6,540,512 B1 | 4/2003 | Sachdeva et al. |
| 6,554,611 B2 | 4/2003 | Chishti et al. |
| 6,554,613 B1 | 4/2003 | Sachdeva et al. |
| 6,572,693 B1 | 6/2003 | Wu et al. |
| 6,582,226 B2 | 6/2003 | Jordan et al. |
| 6,587,828 B1 | 7/2003 | Sachdeva |
| 6,595,774 B1 | 7/2003 | Risse |
| 6,602,070 B2 | 8/2003 | Miller et al. |
| 6,612,143 B1 | 9/2003 | Butscher et al. |
| 6,616,444 B2 | 9/2003 | Andreiko |
| 6,626,666 B2 | 9/2003 | Chishti et al. |
| 6,629,840 B2 | 10/2003 | Chishti et al. |
| 6,632,089 B2 | 10/2003 | Rubbert |
| 6,648,640 B2 | 11/2003 | Rubbert |
| 6,663,385 B2 | 12/2003 | Tepper |
| 6,679,700 B2 | 1/2004 | McGann |
| 6,682,344 B1 | 1/2004 | Stockstill |
| 6,685,469 B2 | 2/2004 | Chishti et al. |
| 6,685,470 B2 | 2/2004 | Chishti et al. |
| 6,688,885 B1 | 2/2004 | Sachdeva et al. |
| 6,699,037 B2 | 3/2004 | Chishti et al. |
| 6,702,575 B2 | 3/2004 | Hilliard |
| 6,705,863 B2 | 3/2004 | Phan et al. |
| 6,722,878 B2 | 4/2004 | Graham |
| 6,722,880 B2 | 4/2004 | Chishti et al. |
| 6,728,423 B1 | 4/2004 | Rubbert et al. |
| 6,729,876 B2 | 5/2004 | Chishti et al. |
| 6,732,558 B2 | 5/2004 | Butscher et al. |
| 6,733,285 B2 | 5/2004 | Puttler et al. |
| 6,733,287 B2 | 5/2004 | Wilkerson |
| 6,733,288 B2 | 5/2004 | Vallittu et al. |
| 6,736,638 B1 | 5/2004 | Sachdeva et al. |
| 6,738,508 B1 | 5/2004 | Rubbert et al. |
| 6,739,869 B1 | 5/2004 | Taub et al. |
| 6,744,914 B1 | 6/2004 | Rubbert et al. |
| 6,744,932 B1 | 6/2004 | Rubbert et al. |
| 6,746,241 B2 | 6/2004 | Townsend-Hansen |
| 6,755,064 B2 | 6/2004 | Butscher |
| 6,771,809 B1 | 8/2004 | Rubbert et al. |
| 6,776,614 B2 | 8/2004 | Wiechmann |
| 6,811,397 B2 | 11/2004 | Wool |
| 6,830,450 B2 | 12/2004 | Knopp et al. |
| 6,845,175 B2 | 1/2005 | Kopelman et al. |
| 6,846,179 B2 | 1/2005 | Chapouland |
| 6,851,949 B1 | 2/2005 | Sachdeva et al. |
| 6,860,132 B2 | 3/2005 | Butscher |
| 6,893,257 B2 | 5/2005 | Kelly |
| 6,928,733 B2 | 8/2005 | Rubbert et al. |
| 6,948,931 B2 | 9/2005 | Chishti et al. |
| 6,960,079 B2 | 11/2005 | Brennan et al. |
| 6,971,873 B2 | 12/2005 | Sachdeva |
| 6,976,627 B1 | 12/2005 | Culp et al. |
| 6,988,889 B2 | 1/2006 | Abels |
| 6,996,452 B2 | 2/2006 | Erichsen et al. |
| 7,008,221 B2 | 3/2006 | McGann |
| 7,013,191 B2 | 3/2006 | Rubbert |
| 7,020,963 B2 | 4/2006 | Cleary et al. |
| 7,029,275 B2 | 4/2006 | Rubbert |
| 7,033,171 B2 | 4/2006 | Wilkerson |
| 7,037,107 B2 | 5/2006 | Yamamoto |
| 7,056,115 B2 | 6/2006 | Phan et al. |
| 7,063,531 B2 | 6/2006 | Maijer et al. |
| 7,068,836 B1 | 6/2006 | Rubbert et al. |
| 7,076,980 B2 | 7/2006 | Butscher |
| 7,077,646 B2 | 7/2006 | Hilliard |
| 7,077,647 B2 | 7/2006 | Choi et al. |
| 7,080,979 B2 | 7/2006 | Rubbert et al. |
| 7,092,107 B2 | 8/2006 | Babayoff et al. |
| 7,094,053 B2 | 8/2006 | Andreiko |
| 7,112,065 B2 | 9/2006 | Kopelman et al. |
| 7,125,248 B2 | 10/2006 | Phan et al. |
| 7,134,874 B2 | 11/2006 | Chishti et al. |
| 7,137,812 B2 | 11/2006 | Cleary et al. |
| 7,155,373 B2 | 12/2006 | Jordan et al. |
| 7,156,661 B2 | 1/2007 | Choi et al. |
| 7,160,110 B2 | 1/2007 | Imgrund et al. |
| 7,168,950 B2 | 1/2007 | Cinader, Jr. et al. |
| 7,172,417 B2 | 2/2007 | Sporbert et al. |
| 7,175,428 B2 | 2/2007 | Nicholson |
| 7,186,115 B2 | 3/2007 | Goldberg et al. |
| 7,188,421 B2 | 3/2007 | Cleary et al. |
| 7,201,574 B1 | 4/2007 | Wiley |
| 7,204,690 B2 | 4/2007 | Hanson et al. |
| 7,214,056 B2 | 5/2007 | Stockstill |
| 7,229,282 B2 | 6/2007 | Andreiko |
| 7,234,934 B2 | 6/2007 | Rosenberg |
| 7,234,936 B2 | 6/2007 | Lai |
| 7,234,937 B2 | 6/2007 | Sachdeva et al. |
| 7,240,528 B2 | 7/2007 | Weise et al. |
| 7,244,121 B2 | 7/2007 | Brosius |
| 7,245,977 B1 | 7/2007 | Simkins |
| 7,252,506 B2 | 8/2007 | Lai |
| 7,267,545 B2 | 9/2007 | Oda |
| 7,283,891 B2 | 10/2007 | Butscher |
| 7,296,996 B2 | 11/2007 | Sachdeva |
| 7,335,021 B2 | 2/2008 | Nikodem |
| 7,347,688 B2 | 3/2008 | Kopelman et al. |
| 7,354,268 B2 | 4/2008 | Raby et al. |
| 7,357,634 B2 | 4/2008 | Knopp |
| 7,361,017 B2 | 4/2008 | Sachdeva |
| 7,364,428 B2 | 4/2008 | Cinader, Jr. et al. |
| 7,404,714 B2 | 7/2008 | Cleary et al. |
| 7,410,357 B2 | 8/2008 | Cleary et al. |
| 7,416,408 B2 | 8/2008 | Farzin-Nia et al. |
| 7,442,041 B2 | 10/2008 | Imgrund et al. |
| 7,452,205 B2 | 11/2008 | Cinader, Jr. et al. |
| 7,458,812 B2 | 12/2008 | Sporbert et al. |
| 7,469,783 B2 | 12/2008 | Rose, Sr. |
| 7,471,821 B2 | 12/2008 | Rubbert et al. |
| 7,473,097 B2 | 1/2009 | Raby et al. |
| 7,556,496 B2 | 7/2009 | Cinader, Jr. et al. |
| 7,578,673 B2 | 8/2009 | Wen et al. |
| 7,578,674 B2 | 8/2009 | Chishti et al. |
| 7,585,172 B2 | 9/2009 | Rubbert |
| 7,590,462 B2 | 9/2009 | Rubbert |
| 7,604,181 B2 | 10/2009 | Culp et al. |
| 7,621,743 B2 | 11/2009 | Bathen |
| 7,641,473 B2 | 1/2010 | Sporbert |
| 7,674,110 B2 | 3/2010 | Oda |
| 7,677,887 B2 | 3/2010 | Nicholson |
| 7,699,606 B2 | 4/2010 | Sachdeva et al. |
| 7,704,072 B2 | 4/2010 | Damon |
| 7,717,708 B2 | 5/2010 | Sachdeva |
| 7,722,354 B1 | 5/2010 | Dumas |
| 7,726,470 B2 | 6/2010 | Cinader, Jr. et al. |
| 7,726,968 B2 | 6/2010 | Raby et al. |
| 7,751,925 B2 | 7/2010 | Rubbert |
| 7,762,815 B2 | 7/2010 | Cinader, Jr. et al. |
| 7,811,087 B2 | 10/2010 | Wiechmann |
| 7,837,464 B2 | 11/2010 | Marshall |
| 7,837,466 B2 | 11/2010 | Griffith et al. |
| 7,837,467 B2 | 11/2010 | Butscher |
| 7,845,938 B2 | 12/2010 | Kim et al. |
| 7,850,451 B2 | 12/2010 | Wiechmann |
| 7,871,267 B2 | 1/2011 | Griffith et al. |
| 7,878,806 B2 | 2/2011 | Lemchen |
| 7,909,603 B2 | 3/2011 | Oda |
| D636,084 S | 4/2011 | Troester |
| D636,085 S | 4/2011 | Troester |
| 7,950,131 B2 | 5/2011 | Hilliard |
| 7,993,133 B2 | 8/2011 | Cinader, Jr. et al. |

(56) References Cited

U.S. PATENT DOCUMENTS

| | | |
|---|---|---|
| 8,021,146 B2 | 9/2011 | Cinader, Jr. et al. |
| 8,029,275 B2 | 10/2011 | Kesling |
| 8,033,824 B2 | 10/2011 | Oda et al. |
| 8,038,444 B2 | 10/2011 | Kitching et al. |
| 8,047,034 B2 | 11/2011 | Butscher |
| 8,057,226 B2 | 11/2011 | Wiechmann |
| 8,070,487 B2 | 12/2011 | Chishti et al. |
| 8,082,769 B2 | 12/2011 | Butscher |
| 8,092,215 B2 | 1/2012 | Stone-Collonge et al. |
| 8,102,538 B2 | 1/2012 | Babayoff |
| 8,113,828 B1 | 2/2012 | Greenfield |
| 8,113,829 B2 | 2/2012 | Sachdeva |
| 8,114,327 B2 | 2/2012 | Cinader, Jr. et al. |
| 8,121,718 B2 | 2/2012 | Rubbert |
| 8,142,187 B2 | 3/2012 | Sporbert |
| 8,152,519 B1 | 4/2012 | Dumas et al. |
| 8,177,551 B2 | 5/2012 | Sachdeva et al. |
| 8,192,196 B2 | 6/2012 | Singh |
| 8,192,197 B2 | 6/2012 | Sporbert |
| 8,194,067 B2 | 6/2012 | Raby |
| 8,220,195 B2 | 7/2012 | Maijer et al. |
| 8,251,699 B2 | 8/2012 | Reising et al. |
| 8,266,940 B2 | 9/2012 | Riemeir et al. |
| 8,297,970 B2 | 10/2012 | Kanomi |
| 8,308,478 B2 | 11/2012 | Primus et al. |
| 8,313,327 B1 | 11/2012 | Won |
| 8,359,115 B2 | 1/2013 | Kopelman et al. |
| 8,363,228 B2 | 1/2013 | Babayoff |
| 8,366,440 B2 | 2/2013 | Bathen |
| 8,376,739 B2 | 2/2013 | Dupray |
| 8,382,917 B2 | 2/2013 | Johnson |
| 8,393,896 B2 | 3/2013 | Oda |
| 8,417,366 B2 | 4/2013 | Getto |
| 8,439,671 B2 | 5/2013 | Cinader, Jr. |
| 8,439,672 B2 | 5/2013 | Matov et al. |
| 8,451,456 B2 | 5/2013 | Babayoff |
| 8,454,364 B2 | 6/2013 | Taub et al. |
| 8,459,988 B2 | 6/2013 | Dumas |
| 8,465,279 B2 | 6/2013 | Bathen |
| 8,469,704 B2 | 6/2013 | Oda et al. |
| 8,479,393 B2 | 7/2013 | Abels et al. |
| 8,485,816 B2 | 7/2013 | Macchi |
| 8,491,306 B2 | 7/2013 | Raby et al. |
| D688,803 S | 8/2013 | Gilbert |
| 8,500,445 B2 | 8/2013 | Borri |
| 8,517,727 B2 | 8/2013 | Raby et al. |
| 8,545,221 B2 | 10/2013 | Sonte-Collenge et al. |
| 8,550,814 B1 | 10/2013 | Collins |
| 8,562,337 B2 | 10/2013 | Kuo et al. |
| 8,573,972 B2 | 11/2013 | Matov et al. |
| 8,591,225 B2 | 11/2013 | Wu et al. |
| 8,591,226 B2 | 11/2013 | Griffith et al. |
| 8,636,505 B2 | 1/2014 | Fornoff |
| 8,638,447 B2 | 1/2014 | Babayoff et al. |
| 8,638,448 B2 | 1/2014 | Babayoff et al. |
| 8,675,207 B2 | 3/2014 | Babayoff |
| 8,678,818 B2 | 3/2014 | Dupray |
| 8,690,568 B2 | 4/2014 | Chapouland |
| 8,708,697 B2 | 4/2014 | Li et al. |
| 8,714,972 B2 | 5/2014 | Eichenberg |
| 8,734,149 B2 | 5/2014 | Phan et al. |
| 8,734,690 B2 | 5/2014 | Komori |
| 8,780,106 B2 | 7/2014 | Chishti et al. |
| 8,805,048 B2 | 8/2014 | Batesole |
| 8,805,563 B2 | 8/2014 | Kopelman et al. |
| 8,807,995 B2 | 8/2014 | Kabbani et al. |
| 8,827,697 B2 | 9/2014 | Cinader, Jr. et al. |
| 8,845,330 B2 | 9/2014 | Taub et al. |
| 8,871,132 B2 | 10/2014 | Abels et al. |
| 8,931,171 B2 | 1/2015 | Rosenberg |
| 8,932,054 B1 | 1/2015 | Rosenberg |
| 8,936,464 B2 | 1/2015 | Kopelman |
| 8,961,172 B2 | 2/2015 | Dupray |
| 8,968,365 B2 | 3/2015 | Aschmann et al. |
| 8,979,528 B2 | 3/2015 | Macchi |
| 8,986,004 B2 | 3/2015 | Dumas |
| 8,992,215 B2 | 3/2015 | Chapouland |
| 8,998,608 B2 | 4/2015 | Imgrund et al. |
| 9,022,781 B2 | 5/2015 | Kuo et al. |
| D731,659 S | 6/2015 | Singh |
| 9,066,775 B2 | 6/2015 | Bukhary |
| 9,089,386 B2 | 7/2015 | Hagelganz |
| D736,945 S | 8/2015 | Singh |
| 9,101,433 B2 | 8/2015 | Babayoff |
| 9,119,689 B2 | 9/2015 | Kabbani |
| 9,127,338 B2 | 9/2015 | Johnson |
| 9,144,473 B2 | 9/2015 | Aldo |
| 9,161,823 B2 | 10/2015 | Morton et al. |
| 9,204,942 B2 | 12/2015 | Phan et al. |
| 9,299,192 B2 | 3/2016 | Kopelman |
| 9,301,815 B2 | 4/2016 | Dumas |
| 9,329,675 B2 | 5/2016 | Ojelund et al. |
| 9,339,352 B2 | 5/2016 | Cinader et al. |
| 9,387,055 B2 | 7/2016 | Cinader, Jr. et al. |
| 9,402,695 B2 | 8/2016 | Curiel et al. |
| 9,427,291 B2 | 8/2016 | Khoshnevis et al. |
| 9,427,916 B2 | 8/2016 | Taub et al. |
| 9,433,477 B2 | 9/2016 | Borovinskih et al. |
| 9,439,737 B2 | 9/2016 | Gonzales et al. |
| 9,451,873 B1 | 9/2016 | Kopelman et al. |
| 9,492,246 B2 | 11/2016 | Lin |
| 9,498,302 B1 | 11/2016 | Patel |
| D774,193 S | 12/2016 | Makmel et al. |
| 9,510,757 B2 | 12/2016 | Kopelman |
| 9,517,112 B2 | 12/2016 | Hagelganz et al. |
| 9,529,970 B2 | 12/2016 | Andreiko |
| 9,532,854 B2 | 1/2017 | Cinader et al. |
| 9,539,064 B2 | 1/2017 | Abels et al. |
| 9,554,875 B2 | 1/2017 | Gualano |
| 9,566,132 B2 | 2/2017 | Stone-Collonge et al. |
| 9,566,134 B2 | 2/2017 | Hagelganz et al. |
| 9,585,733 B2 | 3/2017 | Voudouris |
| 9,585,734 B2 | 3/2017 | Lai et al. |
| 9,597,165 B2 | 3/2017 | Kopelman |
| 9,610,628 B2 | 4/2017 | Riemeier |
| 9,615,901 B2 | 4/2017 | Babayoff et al. |
| 9,622,834 B2 | 4/2017 | Chapouland |
| 9,622,835 B2 | 4/2017 | See et al. |
| 9,629,551 B2 | 4/2017 | Fisker et al. |
| 9,629,694 B2 | 4/2017 | Chun et al. |
| 9,642,678 B2 | 5/2017 | Kuo |
| 9,675,435 B2 | 6/2017 | Karazivan et al. |
| 9,707,056 B2 | 7/2017 | Machata et al. |
| 9,763,750 B2 | 9/2017 | Kim et al. |
| 9,788,917 B2 | 10/2017 | Mah |
| 9,814,543 B2 | 11/2017 | Huang et al. |
| 9,844,420 B2 | 12/2017 | Cheang |
| 9,848,958 B2 | 12/2017 | Matov et al. |
| 9,867,678 B2 | 1/2018 | Macchi |
| 9,867,680 B2 | 1/2018 | Damon |
| 9,872,741 B2 | 1/2018 | Gualano |
| 9,877,804 B2 | 1/2018 | Chester |
| 9,877,805 B2 | 1/2018 | Abels et al. |
| 9,925,020 B2 | 3/2018 | Jo |
| 9,937,018 B2 | 4/2018 | Martz et al. |
| 9,937,020 B2 | 4/2018 | Choi |
| 9,956,058 B2 | 5/2018 | Kopelman |
| 9,962,244 B2 | 5/2018 | Esbech et al. |
| 9,975,294 B2 | 5/2018 | Taub et al. |
| 9,987,105 B2 | 6/2018 | Dupray |
| 10,028,804 B2 | 7/2018 | Schulhof et al. |
| 10,045,834 B2 | 8/2018 | Gualano |
| 10,052,177 B2 | 8/2018 | Andreiko |
| 10,058,400 B2 | 8/2018 | Abels et al. |
| 10,058,401 B2 | 8/2018 | Tan |
| 10,064,706 B2 | 9/2018 | Dickerson |
| 10,070,943 B2 | 9/2018 | Fornoff |
| 10,076,780 B2 | 9/2018 | Riemeier et al. |
| 10,098,709 B1 | 10/2018 | Kitching et al. |
| 10,130,987 B2 | 11/2018 | Riemeier et al. |
| 10,136,966 B2 | 11/2018 | Reybrouck et al. |
| 10,149,738 B2 | 12/2018 | Lee |
| 10,179,035 B2 | 1/2019 | Shivapuja et al. |
| 10,179,036 B2 | 1/2019 | Lee |

(56) References Cited

U.S. PATENT DOCUMENTS

| | | |
|---|---|---|
| 10,219,877 B2 | 3/2019 | Khoshnevis et al. |
| 10,226,312 B2 | 3/2019 | Khoshnevis et al. |
| 10,238,476 B2 | 3/2019 | Karazivan et al. |
| 10,241,499 B1 | 3/2019 | Griffin |
| 10,278,791 B2 | 5/2019 | Schumacher |
| 10,278,792 B2 | 5/2019 | Wool |
| 10,278,793 B2 | 5/2019 | Gonzalez et al. |
| 10,292,789 B2 | 5/2019 | Martz et al. |
| 10,307,221 B2 | 6/2019 | Cinader, Jr. |
| 10,314,673 B2 | 6/2019 | Schulhof et al. |
| 10,327,867 B2 | 6/2019 | Nikolskiy et al. |
| 10,342,640 B2 | 7/2019 | Cassalia |
| 10,368,961 B2 | 8/2019 | Paehl et al. |
| 10,383,707 B2 | 8/2019 | Roein Peikar et al. |
| D859,663 S | 9/2019 | Cetta et al. |
| 10,413,386 B2 | 9/2019 | Moon et al. |
| 10,426,575 B1 | 10/2019 | Raslambekov |
| 10,456,228 B2 | 10/2019 | Karazivan et al. |
| 10,478,271 B2 | 11/2019 | Patel |
| 10,485,638 B2 | 11/2019 | Salah |
| 10,492,889 B2 | 12/2019 | Kim et al. |
| 10,492,890 B2 | 12/2019 | Cinader, Jr. et al. |
| 10,555,792 B2 | 2/2020 | Kopelman et al. |
| 10,588,717 B2 | 3/2020 | Chun et al. |
| 10,595,966 B2 | 3/2020 | Carrier, Jr. et al. |
| 10,596,717 B2 | 3/2020 | Hashish et al. |
| 10,603,137 B2 | 3/2020 | Alauddin et al. |
| 10,636,522 B2 | 4/2020 | Katzman et al. |
| 10,639,130 B2 | 5/2020 | Blees et al. |
| 10,639,134 B2 | 5/2020 | Shangjani et al. |
| 10,717,208 B1 | 7/2020 | Raslambekov et al. |
| 10,754,325 B1 | 8/2020 | Griffin, III |
| 10,758,323 B2 | 9/2020 | Kopelman |
| 10,772,706 B2 | 9/2020 | Schumacher |
| 10,806,376 B2 | 10/2020 | Lotan et al. |
| 10,809,697 B2 | 10/2020 | Grapsas |
| 10,820,966 B2 | 11/2020 | Kim et al. |
| 10,828,133 B2 | 11/2020 | Tong et al. |
| 10,849,723 B1 | 12/2020 | Yancey et al. |
| 10,869,738 B2 | 12/2020 | Witte et al. |
| 10,881,488 B2 | 1/2021 | Kopelman |
| 10,881,489 B2 | 1/2021 | Tong et al. |
| 10,905,527 B2 | 2/2021 | Roein Peikar et al. |
| 10,932,887 B2 | 3/2021 | Hung |
| 10,935,958 B2 | 3/2021 | Sirovskiy et al. |
| 10,952,820 B2 | 3/2021 | Song et al. |
| 10,980,614 B2 | 4/2021 | Roein Peikar et al. |
| 10,984,549 B2 | 4/2021 | Goncharov et al. |
| 10,993,782 B1 | 5/2021 | Raslambekov |
| 10,993,785 B2 | 5/2021 | Roein Peikar et al. |
| 10,996,813 B2 | 5/2021 | Makarenkova et al. |
| 11,020,205 B2 | 6/2021 | Li et al. |
| 11,045,281 B2 | 6/2021 | Tsai et al. |
| 11,045,295 B2 | 6/2021 | Karazivan et al. |
| 11,058,517 B2 | 7/2021 | Tong et al. |
| 11,058,518 B2 | 7/2021 | Roein Peikar et al. |
| 11,058,520 B2 | 7/2021 | Khoshnevis et al. |
| 11,072,021 B2 | 7/2021 | Riemeier et al. |
| 11,083,411 B2 | 8/2021 | Yancey et al. |
| 11,083,546 B2 | 8/2021 | Cassalia |
| 11,103,330 B2 | 8/2021 | Webber et al. |
| 11,129,696 B2 | 9/2021 | Khoshnevis et al. |
| 11,147,652 B2 | 10/2021 | Mason et al. |
| 11,154,382 B2 | 10/2021 | Kopelman et al. |
| 11,229,505 B2 | 1/2022 | Schumacher et al. |
| 11,234,794 B2 | 2/2022 | Pokotilov et al. |
| 11,259,899 B2 * | 3/2022 | Hoss ............... A61C 7/28 |
| 11,304,781 B2 | 4/2022 | Chun et al. |
| 11,317,994 B2 | 5/2022 | Peikar et al. |
| 11,317,995 B2 | 5/2022 | Peikar et al. |
| 11,324,572 B2 | 5/2022 | Peikar et al. |
| 11,331,165 B2 | 5/2022 | Owen |
| 11,337,486 B2 | 5/2022 | Oda et al. |
| 11,357,598 B2 | 6/2022 | Cramer |
| 11,382,720 B2 | 7/2022 | Kopelman et al. |
| 11,413,117 B2 | 8/2022 | Griffin, III et al. |
| 11,419,701 B2 | 8/2022 | Shanjani et al. |
| 11,433,658 B2 | 9/2022 | Friedrich et al. |
| 11,435,142 B2 | 9/2022 | Hauptmann |
| 11,446,117 B2 | 9/2022 | Paehl et al. |
| 11,446,219 B2 | 9/2022 | Kohler et al. |
| 11,464,604 B2 | 10/2022 | Makarenkova et al. |
| 11,471,254 B2 | 10/2022 | Owen |
| 11,471,255 B2 | 10/2022 | Cinader, Jr. et al. |
| 11,478,335 B2 | 10/2022 | Lai et al. |
| 11,478,337 B2 | 10/2022 | Griffin, III et al. |
| 11,490,995 B2 | 11/2022 | Wratten, Jr. et al. |
| 11,500,354 B2 | 11/2022 | Griffin, III et al. |
| 11,504,212 B2 | 11/2022 | Wratten, Jr. et al. |
| 11,510,757 B2 | 11/2022 | Khoshnevis et al. |
| 11,510,758 B2 | 11/2022 | Khoshnevis et al. |
| D972,732 S | 12/2022 | Villanueva |
| 11,517,405 B2 | 12/2022 | Khoshnevis et al. |
| 11,612,458 B1 | 3/2023 | Tong et al. |
| 11,612,459 B2 | 3/2023 | Tong et al. |
| 11,696,816 B2 | 7/2023 | Gardner |
| 11,911,971 B2 | 2/2024 | Tong et al. |
| 11,957,536 B2 | 4/2024 | Tong et al. |
| 12,042,354 B2 | 7/2024 | Tong et al. |
| 12,053,345 B2 | 8/2024 | Tong et al. |
| 12,053,346 B2 | 8/2024 | Suh et al. |
| D1,043,994 S | 9/2024 | Oda et al. |
| 12,090,025 B2 | 9/2024 | Oda et al. |
| 12,193,908 B2 | 1/2025 | Oda et al. |
| 2001/0055741 A1 | 12/2001 | Dixon et al. |
| 2002/0006597 A1 | 1/2002 | Andreiko et al. |
| 2002/0010568 A1 | 1/2002 | Rubbert et al. |
| 2002/0081546 A1 | 6/2002 | Tricca et al. |
| 2002/0098460 A1 | 7/2002 | Farzin-Nia |
| 2002/0192617 A1 | 12/2002 | Phan et al. |
| 2003/0049582 A1 | 3/2003 | Abels et al. |
| 2003/0070468 A1 | 4/2003 | Butscher et al. |
| 2003/0073052 A1 | 4/2003 | Yamamoto |
| 2003/0180689 A1 | 9/2003 | Arx et al. |
| 2003/0194677 A1 | 10/2003 | Sachdeva et al. |
| 2003/0207224 A1 | 11/2003 | Lotte |
| 2004/0048222 A1 | 3/2004 | Forster et al. |
| 2004/0072120 A1 | 4/2004 | Lauren |
| 2004/0083611 A1 | 5/2004 | Rubbert et al. |
| 2004/0161722 A1 | 8/2004 | Lai et al. |
| 2004/0166459 A1 | 8/2004 | Voudouris |
| 2004/0168752 A1 | 9/2004 | Julien |
| 2004/0199177 A1 | 10/2004 | Kim |
| 2004/0219471 A1 | 11/2004 | Cleary et al. |
| 2005/0043837 A1 | 2/2005 | Rubbert et al. |
| 2005/0074716 A1 | 4/2005 | Cleary et al. |
| 2005/0106529 A1 | 5/2005 | Abolfathi et al. |
| 2005/0181332 A1 | 8/2005 | Sernetz |
| 2005/0191592 A1 | 9/2005 | Farzin-Nia et al. |
| 2005/0233276 A1 | 10/2005 | Kopelman et al. |
| 2005/0244780 A1 | 11/2005 | Abels et al. |
| 2005/0244781 A1 | 11/2005 | Abels et al. |
| 2005/0244790 A1 | 11/2005 | Kuperman |
| 2006/0006092 A1 | 1/2006 | DuBos |
| 2006/0014116 A1 | 1/2006 | Maijer et al. |
| 2006/0068354 A1 | 3/2006 | Jeckel |
| 2006/0127834 A1 | 6/2006 | Szwajkowski et al. |
| 2006/0175209 A1 | 8/2006 | Sabilla et al. |
| 2006/0223021 A1 | 10/2006 | Cinader et al. |
| 2006/0223031 A1 | 10/2006 | Cinader, Jr. et al. |
| 2006/0257813 A1 | 11/2006 | Highland |
| 2006/0257821 A1 | 11/2006 | Cinader, Jr. et al. |
| 2007/0015103 A1 | 1/2007 | Sorel |
| 2007/0031773 A1 | 2/2007 | Scuzzo |
| 2007/0031775 A1 | 2/2007 | Andreiko |
| 2007/0087302 A1 | 4/2007 | Reising et al. |
| 2007/0107745 A1 | 5/2007 | Kiyomoto |
| 2007/0111154 A1 | 5/2007 | Sampermans |
| 2007/0118215 A1 | 5/2007 | Moaddeb |
| 2007/0134611 A1 | 6/2007 | Nicholson |
| 2007/0134612 A1 * | 6/2007 | Contencin ............... A61C 7/14 433/20 |
| 2007/0141525 A1 | 6/2007 | Cinader, Jr. |
| 2007/0154859 A1 | 7/2007 | Hilliard |

(56) References Cited

U.S. PATENT DOCUMENTS

| | | |
|---|---|---|
| 2007/0172788 A1 | 7/2007 | Il et al. |
| 2007/0190478 A1 | 8/2007 | Goldberg et al. |
| 2007/0231768 A1 | 10/2007 | Hutchinson |
| 2007/0235051 A1 | 10/2007 | Robinson |
| 2007/0287121 A1 | 12/2007 | Cinader et al. |
| 2008/0032250 A1 | 2/2008 | Kopelman et al. |
| 2008/0057460 A1 | 3/2008 | Hicks |
| 2008/0063995 A1 | 3/2008 | Farzin-Nia et al. |
| 2008/0131831 A1* | 6/2008 | Abels .................. A61C 7/20 433/10 |
| 2008/0160475 A1 | 7/2008 | Rojas-Pardini |
| 2008/0199825 A1* | 8/2008 | Jahn .................... A61C 7/30 433/11 |
| 2008/0227049 A1 | 9/2008 | Sevinc |
| 2008/0233528 A1 | 9/2008 | Kim et al. |
| 2008/0233530 A1 | 9/2008 | Cinader |
| 2008/0233531 A1 | 9/2008 | Raby et al. |
| 2008/0248439 A1 | 10/2008 | Griffith et al. |
| 2008/0254403 A1 | 10/2008 | Hilliard |
| 2008/0268398 A1 | 10/2008 | Cantarella |
| 2008/0286711 A1 | 11/2008 | Corcoran et al. |
| 2008/0305450 A1 | 12/2008 | Steen |
| 2009/0004619 A1 | 1/2009 | Oda et al. |
| 2009/0017410 A1 | 1/2009 | Raby et al. |
| 2009/0019698 A1 | 1/2009 | Christoff |
| 2009/0042160 A1 | 2/2009 | Ofir |
| 2009/0088838 A1 | 4/2009 | Shaolian et al. |
| 2009/0136889 A1* | 5/2009 | Abels .................. A61C 7/12 433/10 |
| 2009/0191502 A1 | 7/2009 | Cao et al. |
| 2009/0197217 A1 | 8/2009 | Butscher et al. |
| 2009/0216322 A1 | 8/2009 | Le et al. |
| 2009/0220907 A1 | 9/2009 | Suyama |
| 2009/0220920 A1 | 9/2009 | Primus et al. |
| 2009/0222075 A1 | 9/2009 | Gordon |
| 2010/0092903 A1 | 4/2010 | Sabilla |
| 2010/0092905 A1 | 4/2010 | Martin |
| 2010/0105000 A1 | 4/2010 | Scommegna |
| 2010/0129765 A1 | 5/2010 | Mohr et al. |
| 2010/0129766 A1 | 5/2010 | Hilgers |
| 2010/0151403 A1* | 6/2010 | Tuneberg ............. A61C 7/287 433/10 |
| 2010/0178628 A1 | 7/2010 | Kim |
| 2010/0179789 A1 | 7/2010 | Sachdeva et al. |
| 2010/0193979 A1 | 8/2010 | Goldberg et al. |
| 2010/0241120 A1 | 9/2010 | Bledsoe et al. |
| 2010/0279243 A1 | 11/2010 | Cinader, Jr. et al. |
| 2010/0285421 A1* | 11/2010 | Heiser ................. A61C 7/14 433/11 |
| 2010/0304321 A1 | 12/2010 | Patel |
| 2011/0008745 A1 | 1/2011 | McQuillan et al. |
| 2011/0027743 A1 | 2/2011 | Cinader, Jr. et al. |
| 2011/0033814 A1 | 2/2011 | Wool |
| 2011/0059414 A1 | 3/2011 | Hirsch |
| 2011/0091832 A1 | 4/2011 | Kim et al. |
| 2011/0220612 A1 | 9/2011 | Kim |
| 2011/0250556 A1 | 10/2011 | Heiser |
| 2011/0270583 A1 | 11/2011 | Getto et al. |
| 2011/0287376 A1 | 11/2011 | Walther |
| 2011/0314891 A1 | 12/2011 | Gilbert |
| 2012/0048432 A1 | 3/2012 | Johnson et al. |
| 2012/0129119 A1 | 5/2012 | Oda |
| 2012/0148972 A1 | 6/2012 | Lewis |
| 2012/0208144 A1 | 8/2012 | Chiaramonte |
| 2012/0266419 A1 | 10/2012 | Browne et al. |
| 2012/0315595 A1 | 12/2012 | Beaudoin |
| 2012/0322019 A1 | 12/2012 | Lewis |
| 2013/0065193 A1 | 3/2013 | Curiel et al. |
| 2013/0122443 A1 | 5/2013 | Huang et al. |
| 2013/0177862 A1 | 7/2013 | Johnson |
| 2013/0196281 A1 | 8/2013 | Thornton |
| 2013/0196282 A1 | 8/2013 | Eichelberger et al. |
| 2013/0260329 A1 | 10/2013 | Voudouris |
| 2013/0315595 A1 | 11/2013 | Barr |
| 2014/0120491 A1* | 5/2014 | Khoshnevis ......... A61C 7/28 433/11 |
| 2014/0154637 A1 | 6/2014 | Hansen et al. |
| 2014/0170586 A1 | 6/2014 | Cantarella |
| 2014/0234794 A1 | 8/2014 | Vu |
| 2014/0255864 A1 | 9/2014 | Machata et al. |
| 2014/0287376 A1 | 9/2014 | Hultgren et al. |
| 2014/0363782 A1 | 12/2014 | Wiechmann et al. |
| 2015/0010879 A1 | 1/2015 | Kurthy |
| 2015/0064641 A1 | 3/2015 | Gardner |
| 2015/0072299 A1 | 3/2015 | Alauddin et al. |
| 2015/0140501 A1 | 5/2015 | Kim |
| 2015/0201943 A1 | 7/2015 | Brooks et al. |
| 2015/0265376 A1 | 9/2015 | Kopelman |
| 2015/0305833 A1 | 10/2015 | Cosse |
| 2015/0313687 A1 | 11/2015 | Blees et al. |
| 2015/0351872 A1 | 12/2015 | Jo |
| 2015/0359610 A1 | 12/2015 | Gonzalez et al. |
| 2015/0366638 A1 | 12/2015 | Kopelman et al. |
| 2016/0074139 A1 | 3/2016 | Machata et al. |
| 2016/0095670 A1 | 4/2016 | Witte et al. |
| 2016/0106522 A1 | 4/2016 | Kim |
| 2016/0135926 A1 | 5/2016 | Djamchidi |
| 2016/0166357 A1 | 6/2016 | Portalupi |
| 2016/0175073 A1 | 6/2016 | Huang |
| 2016/0206403 A1 | 7/2016 | Ouellette et al. |
| 2016/0228214 A1 | 8/2016 | Sachdeva et al. |
| 2016/0242871 A1 | 8/2016 | Morton et al. |
| 2016/0256242 A1 | 9/2016 | Cinader, Jr. et al. |
| 2016/0270885 A1 | 9/2016 | Kwon et al. |
| 2016/0278883 A1 | 9/2016 | Fasci et al. |
| 2016/0287354 A1 | 10/2016 | Viecilli et al. |
| 2016/0310239 A1 | 10/2016 | Paehl et al. |
| 2016/0361141 A1 | 12/2016 | Tong et al. |
| 2016/0361142 A1 | 12/2016 | Tong et al. |
| 2016/0374780 A1 | 12/2016 | Carrillo Gonzalez et al. |
| 2017/0086948 A1 | 3/2017 | Von Mandach |
| 2017/0105816 A1 | 4/2017 | Ward |
| 2017/0105817 A1 | 4/2017 | Chun et al. |
| 2017/0128169 A1 | 5/2017 | Lai et al. |
| 2017/0135793 A1 | 5/2017 | Webber et al. |
| 2017/0140381 A1 | 5/2017 | Ducrohet et al. |
| 2017/0151037 A1 | 6/2017 | Lee |
| 2017/0156823 A1 | 6/2017 | Roein et al. |
| 2017/0165032 A1 | 6/2017 | Webber et al. |
| 2017/0165532 A1 | 6/2017 | Khan et al. |
| 2017/0181813 A1 | 6/2017 | Kalkhoran |
| 2017/0196660 A1 | 7/2017 | Lee |
| 2017/0224444 A1 | 8/2017 | Viecilli et al. |
| 2017/0231721 A1 | 8/2017 | Akeel et al. |
| 2017/0246682 A1 | 8/2017 | Duerig |
| 2017/0252140 A1 | 9/2017 | Murphy et al. |
| 2017/0281313 A1 | 10/2017 | Kim |
| 2017/0281314 A1 | 10/2017 | Freimuller |
| 2017/0296253 A1 | 10/2017 | Brandner et al. |
| 2017/0296304 A1* | 10/2017 | Tong .................... A61C 7/28 |
| 2017/0312052 A1 | 11/2017 | Moss et al. |
| 2017/0318881 A1 | 11/2017 | Fonte et al. |
| 2017/0325911 A1 | 11/2017 | Marshall |
| 2017/0340777 A1 | 11/2017 | Ma et al. |
| 2018/0014915 A1 | 1/2018 | Voudouris |
| 2018/0014916 A1 | 1/2018 | Cinader, Jr. et al. |
| 2018/0021108 A1 | 1/2018 | Cinader, Jr. et al. |
| 2018/0049847 A1 | 2/2018 | Oda et al. |
| 2018/0055605 A1 | 3/2018 | Witte et al. |
| 2018/0071057 A1 | 3/2018 | Rudman |
| 2018/0110589 A1 | 4/2018 | Gao |
| 2018/0132974 A1 | 5/2018 | Rudman |
| 2018/0153651 A1 | 6/2018 | Tong et al. |
| 2018/0161121 A1 | 6/2018 | Butler et al. |
| 2018/0161126 A1 | 6/2018 | Marshall et al. |
| 2018/0168788 A1 | 6/2018 | Fernie |
| 2018/0185120 A1 | 7/2018 | Wool |
| 2018/0185121 A1 | 7/2018 | Pitts et al. |
| 2018/0206941 A1 | 7/2018 | Lee |
| 2018/0214250 A1 | 8/2018 | Martz |
| 2018/0221113 A1 | 8/2018 | Tong et al. |
| 2018/0235437 A1 | 8/2018 | Ozerov et al. |
| 2018/0243052 A1 | 8/2018 | Lee |

(56) References Cited

U.S. PATENT DOCUMENTS

| | | |
|---|---|---|
| 2018/0303583 A1 | 10/2018 | Tong et al. |
| 2018/0318047 A1* | 11/2018 | Kesling .................... A61C 7/28 |
| 2018/0338564 A1 | 11/2018 | Oda et al. |
| 2019/0001396 A1 | 1/2019 | Riemeier et al. |
| 2019/0019187 A1 | 1/2019 | Miller et al. |
| 2019/0053876 A1 | 2/2019 | Sterental et al. |
| 2019/0090988 A1 | 3/2019 | Schumacher et al. |
| 2019/0090989 A1 | 3/2019 | Jo |
| 2019/0125494 A1 | 5/2019 | Li et al. |
| 2019/0142551 A1 | 5/2019 | Dickenson et al. |
| 2019/0159871 A1 | 5/2019 | Chan et al. |
| 2019/0163060 A1 | 5/2019 | Skamser et al. |
| 2019/0175304 A1 | 6/2019 | Morton et al. |
| 2019/0231488 A1 | 8/2019 | Dickerson |
| 2019/0247147 A1 | 8/2019 | Grande et al. |
| 2019/0252065 A1 | 8/2019 | Katzman et al. |
| 2019/0262103 A1 | 8/2019 | Cassalia |
| 2019/0276921 A1 | 9/2019 | Duerig et al. |
| 2019/0321136 A1 | 10/2019 | Martz et al. |
| 2019/0321138 A1 | 10/2019 | Peikar et al. |
| 2019/0328487 A1 | 10/2019 | Levin et al. |
| 2019/0328491 A1 | 10/2019 | Hostettler et al. |
| 2019/0343606 A1 | 11/2019 | Wu et al. |
| 2019/0350682 A1 | 11/2019 | Cinader, Jr. et al. |
| 2019/0365507 A1 | 12/2019 | Khoshnevis et al. |
| 2019/0365508 A1 | 12/2019 | Khoshnevis et al. |
| 2019/0388189 A1 | 12/2019 | Shivapuja et al. |
| 2020/0000551 A1 | 1/2020 | Li et al. |
| 2020/0066391 A1 | 2/2020 | Sachdeva et al. |
| 2020/0078137 A1 | 3/2020 | Chen et al. |
| 2020/0107911 A1 | 4/2020 | Roein Peikar et al. |
| 2020/0129272 A1 | 4/2020 | Roein Peikar et al. |
| 2020/0138549 A1 | 5/2020 | Chun et al. |
| 2020/0146779 A1 | 5/2020 | Zhang |
| 2020/0146791 A1 | 5/2020 | Schülke et al. |
| 2020/0170757 A1 | 6/2020 | Kopelman et al. |
| 2020/0188063 A1 | 6/2020 | Cinader, Jr. et al. |
| 2020/0197131 A1 | 6/2020 | Matov et al. |
| 2020/0214806 A1 | 7/2020 | Hung |
| 2020/0229903 A1 | 7/2020 | Sandwick |
| 2020/0275996 A1 | 9/2020 | Tong et al. |
| 2020/0281611 A1 | 9/2020 | Kelly et al. |
| 2020/0338706 A1 | 10/2020 | Cunningham et al. |
| 2020/0345455 A1 | 11/2020 | Peikar et al. |
| 2020/0345459 A1 | 11/2020 | Schueller et al. |
| 2020/0345460 A1 | 11/2020 | Peikar et al. |
| 2020/0352686 A1 | 11/2020 | Yancey et al. |
| 2020/0352765 A1 | 11/2020 | Lin |
| 2020/0360109 A1 | 11/2020 | Gao et al. |
| 2020/0375270 A1 | 12/2020 | Holschuh et al. |
| 2020/0375699 A1 | 12/2020 | Roein Peikar et al. |
| 2020/0390524 A1 | 12/2020 | Peikar et al. |
| 2020/0390535 A1 | 12/2020 | Curtis et al. |
| 2020/0405191 A1 | 12/2020 | Lotan et al. |
| 2020/0405452 A1 | 12/2020 | Song et al. |
| 2021/0007830 A1 | 1/2021 | Peikar et al. |
| 2021/0007832 A1 | 1/2021 | Roein Peikar et al. |
| 2021/0045701 A1 | 2/2021 | Unklesbay et al. |
| 2021/0068928 A1 | 3/2021 | Witte et al. |
| 2021/0077227 A1 | 3/2021 | Griffin, III et al. |
| 2021/0093422 A1 | 4/2021 | Tong et al. |
| 2021/0128275 A1 | 5/2021 | Suh et al. |
| 2021/0134450 A1 | 5/2021 | Katzman et al. |
| 2021/0137644 A1 | 5/2021 | Benarouch et al. |
| 2021/0145547 A1 | 5/2021 | Roein Peikar et al. |
| 2021/0177551 A1 | 6/2021 | Roein Peikar et al. |
| 2021/0186662 A1 | 6/2021 | Roein Peikar et al. |
| 2021/0205049 A1 | 7/2021 | Cinader, Jr. |
| 2021/0212803 A1 | 7/2021 | Tong et al. |
| 2021/0244502 A1 | 8/2021 | Farkash et al. |
| 2021/0244507 A1 | 8/2021 | Curiel et al. |
| 2021/0251730 A1 | 8/2021 | Curiel et al. |
| 2021/0259808 A1 | 8/2021 | Ben-Gal Nguyen et al. |
| 2021/0275286 A1 | 9/2021 | Karazivan et al. |
| 2021/0330430 A1 | 10/2021 | Khoshnevis et al. |
| 2021/0338380 A1 | 11/2021 | Park et al. |
| 2021/0346127 A1 | 11/2021 | Cassalia |
| 2021/0353389 A1 | 11/2021 | Peikar et al. |
| 2021/0369413 A1 | 12/2021 | Li et al. |
| 2021/0378792 A1 | 12/2021 | Akopov et al. |
| 2021/0386523 A1 | 12/2021 | Raby, II et al. |
| 2021/0393375 A1 | 12/2021 | Chekh et al. |
| 2021/0401546 A1 | 12/2021 | Gardner |
| 2021/0401548 A1 | 12/2021 | Oda et al. |
| 2022/0008169 A1 | 1/2022 | Reisman |
| 2022/0023009 A1* | 1/2022 | Tong ........................ A61C 7/22 |
| 2022/0031428 A1 | 2/2022 | Khoshnevis et al. |
| 2022/0039921 A1 | 2/2022 | Kopelman et al. |
| 2022/0039922 A1 | 2/2022 | Yamaguchi |
| 2022/0061964 A1 | 3/2022 | Khoshnevis et al. |
| 2022/0087783 A1 | 3/2022 | Khoshnevis et al. |
| 2022/0133438 A1 | 5/2022 | Wratten, Jr. et al. |
| 2022/0137592 A1 | 5/2022 | Cramer et al. |
| 2022/0168072 A1 | 6/2022 | Tong et al. |
| 2022/0183797 A1 | 6/2022 | Khoshnevis et al. |
| 2022/0226076 A1 | 7/2022 | Roein Peikar et al. |
| 2022/0226077 A1 | 7/2022 | Roein Peikar et al. |
| 2022/0249201 A1 | 8/2022 | Shuman et al. |
| 2022/0257341 A1 | 8/2022 | Somasundaram et al. |
| 2022/0257344 A1 | 8/2022 | Tsai et al. |
| 2022/0287804 A1 | 9/2022 | Oda |
| 2022/0304773 A1 | 9/2022 | Wratten, Jr. et al. |
| 2022/0304774 A1 | 9/2022 | Wratten, Jr. et al. |
| 2022/0314508 A1 | 10/2022 | Subramaniam et al. |
| 2022/0323183 A1 | 10/2022 | Dufour et al. |
| 2022/0338960 A1 | 10/2022 | Reising |
| 2022/0346912 A1 | 11/2022 | Li et al. |
| 2022/0361996 A1 | 11/2022 | Raby et al. |
| 2023/0012364 A1 | 1/2023 | Melka et al. |
| 2023/0070165 A1* | 3/2023 | Tong ........................ A61C 7/16 |
| 2023/0070837 A1 | 3/2023 | Oda |
| 2023/0072074 A1 | 3/2023 | Oda |
| 2023/0100466 A1 | 3/2023 | Huynh et al. |
| 2023/0157790 A1 | 5/2023 | Medvinskaya et al. |
| 2023/0404715 A1 | 12/2023 | Peikar et al. |
| 2023/0414327 A1 | 12/2023 | Peikar et al. |
| 2024/0058101 A1 | 2/2024 | Tong et al. |
| 2024/0061966 A1 | 2/2024 | Oda et al. |
| 2024/0090980 A1* | 3/2024 | Tong ........................ A61C 7/002 |
| 2024/0138958 A1 | 5/2024 | Oda et al. |
| 2024/0173105 A1 | 5/2024 | Tong et al. |
| 2024/0277452 A1 | 8/2024 | Tong et al. |
| 2024/0358478 A1 | 10/2024 | Tong et al. |
| 2024/0398513 A1 | 12/2024 | Oda et al. |

FOREIGN PATENT DOCUMENTS

| | | |
|---|---|---|
| CN | 201320224 Y | 10/2009 |
| CN | 102152017 | 8/2011 |
| CN | 102215773 | 10/2011 |
| CN | 202365955 | 8/2012 |
| CN | 202892116 | 4/2013 |
| CN | 203074896 | 7/2013 |
| CN | 103505293 | 1/2014 |
| CN | 203506900 | 4/2014 |
| CN | 104188728 | 12/2014 |
| CN | 204049881 | 12/2014 |
| CN | 205126459 | 4/2016 |
| CN | 105596098 | 5/2016 |
| CN | 105662615 | 6/2016 |
| CN | 205416056 | 8/2016 |
| CN | 205569100 | 9/2016 |
| CN | 106029002 | 10/2016 |
| CN | 106137419 | 11/2016 |
| CN | 105520787 | 12/2017 |
| CN | 108690967 | 10/2018 |
| CN | 109009504 | 12/2018 |
| CN | 110916820 | 2/2020 |
| CN | 110840586 | 2/2022 |
| CN | 114167807 | 3/2022 |
| CN | 117695035 | 3/2024 |
| DE | 3915807 | 11/1990 |
| DE | 20 2018 003 574 U1 | 8/2018 |
| DE | 10 2018 005 769 A1 | 1/2020 |

(56) References Cited

FOREIGN PATENT DOCUMENTS

| | | |
|---|---|---|
| DE | 10 2018 133 705 A1 | 7/2020 |
| DE | 10 2015 017 301 B3 | 3/2022 |
| EP | 0 778 008 | 6/1997 |
| EP | 1139902 | 10/2001 |
| EP | 1276433 | 1/2003 |
| EP | 1 379 193 B1 | 2/2007 |
| EP | 2076207 | 7/2009 |
| EP | 1 073 378 B1 | 1/2012 |
| EP | 2522298 | 11/2012 |
| EP | 2617383 | 7/2013 |
| EP | 3 285 678 | 5/2021 |
| EP | 3 954 320 | 2/2022 |
| EP | 2 726 049 | 8/2022 |
| EP | 3 019 141 | 8/2022 |
| EP | 4 034 077 | 8/2022 |
| EP | 4 035 649 | 8/2022 |
| EP | 4 044 959 | 8/2022 |
| EP | 4 048 196 | 8/2022 |
| EP | 4065647 A1 | 8/2022 |
| EP | 3 691 559 | 9/2022 |
| EP | 3 823 813 | 9/2022 |
| EP | 3 905 986 | 9/2022 |
| EP | 4 056 144 | 9/2022 |
| ES | 2315046 | 4/2010 |
| FR | 2 525 469 | 10/1983 |
| FR | 3 056 393 B1 | 10/2018 |
| JP | 11221235 A | 8/1999 |
| JP | 2001198143 A | 7/2001 |
| JP | 2009205330 A | 9/2009 |
| KR | 100549294 | 2/2006 |
| KR | 100737442 | 7/2007 |
| KR | 100925286 | 11/2009 |
| KR | 101301886 | 8/2013 |
| KR | 101583547 | 1/2016 |
| KR | 101584737 | 1/2016 |
| KR | 101723674 | 4/2017 |
| RU | 133408 U1 | 10/2013 |
| WO | WO 01/80761 | 11/2001 |
| WO | WO 01/85047 | 11/2001 |
| WO | WO 03/045266 | 6/2003 |
| WO | WO 2005/008441 | 1/2005 |
| WO | WO 2005/094716 | 10/2005 |
| WO | WO 2007/069286 | 6/2007 |
| WO | WO 2008/051774 | 5/2008 |
| WO | WO 2011/034522 | 3/2011 |
| WO | WO 2011/090502 | 7/2011 |
| WO | WO 2011/103669 | 9/2011 |
| WO | WO 2012/089735 | 7/2012 |
| WO | WO 2012/140021 | 10/2012 |
| WO | WO 2013/019398 | 2/2013 |
| WO | WO 2014/070920 | 5/2014 |
| WO | WO 2016/148961 | 9/2016 |
| WO | WO 2016/149007 | 9/2016 |
| WO | WO 2016/149008 | 9/2016 |
| WO | WO 2016/199972 | 12/2016 |
| WO | WO 2016/210402 | 12/2016 |
| WO | WO 2017/007079 | 1/2017 |
| WO | WO 2017/100198 | 6/2017 |
| WO | WO 2017/112004 | 6/2017 |
| WO | WO 2017/172537 | 10/2017 |
| WO | WO 2017/184632 | 10/2017 |
| WO | WO 2017/194478 A1 | 11/2017 |
| WO | WO 2017/198640 A1 | 11/2017 |
| WO | WO 2018/102588 | 6/2018 |
| WO | WO 2018122862 A1 | 7/2018 |
| WO | WO 2018/144634 | 8/2018 |
| WO | WO 2018/195356 | 10/2018 |
| WO | WO 2019/135504 | 7/2019 |
| WO | WO 2020/095182 | 5/2020 |
| WO | WO 2020/178353 | 9/2020 |
| WO | WO 2020/180740 | 9/2020 |
| WO | WO 2020/223744 | 11/2020 |
| WO | WO 2020/223745 | 11/2020 |
| WO | WO 2021/087158 | 5/2021 |
| WO | WO 2021/105878 | 6/2021 |
| WO | WO 2021/130611 | 7/2021 |
| WO | WO 2021/214613 | 10/2021 |
| WO | WO 2021/225916 A2 | 11/2021 |
| WO | WO 2021/226618 | 11/2021 |
| WO | WO 2021/225916 A3 | 12/2021 |
| WO | WO 2021/245484 | 12/2021 |
| WO | WO 2021/252675 | 12/2021 |
| WO | WO 2022/099263 | 5/2022 |
| WO | WO 2022/099267 | 5/2022 |
| WO | WO 2022/123402 | 6/2022 |
| WO | WO 2022/137109 | 6/2022 |
| WO | WO 2022/145602 | 7/2022 |
| WO | WO 2022/159738 | 7/2022 |
| WO | WO 2022/162488 | 8/2022 |
| WO | WO 2022/162528 | 8/2022 |
| WO | WO 2022/162614 | 8/2022 |
| WO | WO 2022/167899 | 8/2022 |
| WO | WO 2022/167995 | 8/2022 |
| WO | WO 2022/180466 | 9/2022 |
| WO | WO 2022/189906 | 9/2022 |
| WO | WO 2022/192409 | 9/2022 |
| WO | WO 2022/195391 | 9/2022 |
| WO | WO 2022/204711 | 9/2022 |
| WO | WO 2022/214895 | 10/2022 |
| WO | WO 2022/217269 | 10/2022 |
| WO | WO 2022/219459 | 10/2022 |
| WO | WO 2022/229734 | 11/2022 |
| WO | WO 2022/229739 | 11/2022 |
| WO | WO 2022/236027 | 11/2022 |
| WO | WO 2022/236287 | 11/2022 |
| WO | WO 2023/033869 | 3/2023 |
| WO | WO 2023/033870 | 3/2023 |
| WO | WO 2023/034876 | 3/2023 |
| WO | WO 2024/040008 | 2/2024 |
| WO | WO 2024/059653 | 3/2024 |

OTHER PUBLICATIONS

ElSheikh, Moaaz Mohamed, et al. "A Forsus Distalizer: A Pilot Typodont Study". Jul.-Dec. 2004, KDJ, vol. 7, No. 2, pp. 107-115.

U.S. Appl. No. 15/249,262, filed Aug. 26, 2016, Tong et al.

Gilbert, Alfredo. An in-office wire-bending robot for lingual orthodontics. ResearchGate. Article in Journal of clinical orthodontics: JCO, Apr. 2011.

Glauser-Williams Orthodontics: Appliances, http://www.glauserwilliamsorthodontics.com/treatments/orthodontic-appliances.php , accessed Nov. 30, 2015 in 4 pages.

Jiang et al. Bending Process Analysis and Structure Design of Orthodontic Archwire Bending Robot. International Journal of Smart Home. vol. 7, No. 5 (2013), pp. 345-352. http://dx.doi.org/10.14257/ijsh.2013.7.5.33.

Jiang et al. A Review on Robot in Prosthodontics and Orthodontics. Hindawi Publishing Corporation. Advances in Mechanical Engineering. Article ID 198748. 2014. 11 pages.

Korean Intellectual Property Office (ISA/KR), International Search Report and Written Opinion of the International Searching Authority, dated Feb. 14, 2014, for PCT Application No. PCT/US2013/067560, filed Oct. 30, 2013, entitled Orthodontic Appliance with Snap Fitted, Non-Sliding Archwire.

Mahony, Derek, "How We Got From There to Here and Back". Dental Learning Hub (Capture of web page dated Jun. 24, 2013 downloaded from http://web.archive.org/web/20130624145806/http://www.dental-learninghub.com/Clinical/Orthodontics.aspx, downloaded Feb. 7, 2014).

Miller, R.J. et al. "Validation of Align Technology's Treat III™ Digital Model Superimposition Tool and Its Case Application". Orthodontic Craniofacial Res.,2003, vol. 6 (Suppl 1): pp. 143-149.

SureSmile. 2013. About SureSmile. (Capture of web page dated Jun. 21, 2013 downloaded from http://web.archive.org/web/20130621031404/http://suresmile.com/About-SureSmile, downloaded Feb. 7, 2014).

Xia, et al. Development of a Robotic System for Orthodontic Archwire Bending. 2016 IEEE International Conference on Robotics and Automation (ICRA). Stockholm, Sweden, May 16-21, 2016. pp. 730-735.

(56) References Cited

OTHER PUBLICATIONS

Yang, Won-Sik, et al. "A Study of the Regional Load Deflection Rate of Multiloop Edgewise Arch Wire." Angle Orthodontist, 2001, vol. 7, No. 2, pp. 103-109.

International Search Report for International Application No. PCT/US2017/028180 dated Aug. 14, 2017.

iPhone 3D scanning to dental software, screen shots at 0:09 and 7:00 of YouTube video, https://www.youtube.com/watch?v=QONGdQ3QiFE, uploaded Oct. 1, 2018 in 2 pages.

Invisalign® SmileView™, How Would You Look with Straight Teeth?, https://www.invisalign.com/get-started/invisalign-smileview?v=0#start, printed Jun. 7, 2022 in 2 pages.

A ScanBox demo, https://www.youtube.com/watch?v=MsCfv2PDQ0o, screen shots at 0:08 and 0:19 of YouTube video, uploaded May 5, 2019 in 2 pages.

Southern Maine Orthodontics, Virtual Orthodontic Treatment, https://southernmainebraces.com/virtual-orthodontic-treatment/, printed Jun. 7, 2022 in 3 pages.

Sinodentalgroup, "Braces Bonding Teeth Gems Glue Light Cure Adhesive", https://sinodentalgroup.myshopify.com/products/sino-dental-group-orthodontic-brackets-glue-braces-bonding-light-cure-adhesive-kit?pr_prod_strat=use_description&pr_rec_id=0d0a6cdc9&pr_rec_pid=6687895355572&pr_ref_pid=6705886363828&pr_seq=uniform, dated as downloaded Jun. 7, 2023 in 12 pages.

Spini et al., "Transition temperature range of thermally activated nickel-titanium archwires", J Appl Oral Sci., dated Apr. 2014, vol. 22, No. 2, pp. 109-117.

In Brace, Brush & Floss Easily with In Brace, dated as uploaded on: May 26, 2022, YouTube, Retrieved from Internet: https://www.youtube.com/watch?v=uAsxiBlbY4Y (Dated Year: 2022).

MEAW School, Introduction to MEAW (Multi-loop Edgewise Arch Wire), dated as uploaded On: Mar. 24, 2021, YouTube, Retrieved from Internet: https://www.youtube.com/watch?v=ne785jIzN Pg (Year: 2021).

Richard Gawel, Swift Health Systems Raises $45 Million to Finance Invisible Orthodontics, dated as published on: Dec. 4, 2019, dentistrytoday.com, Retrieved from Internet: https://www.dentistrytoday.com/products/swift-health-systems-raises-45-million-to-finance-invisible-orthodontics/ (Dated Year: 2019).

In Brace, What Is In Brace?—Integration Booster, dated as uploaded on: May 22, 2023, YouTube, Retrieved from Internet: https://www.youtube.com/watch?v=ANUPkCSfQo4 (Dated Year: 2023).

* cited by examiner

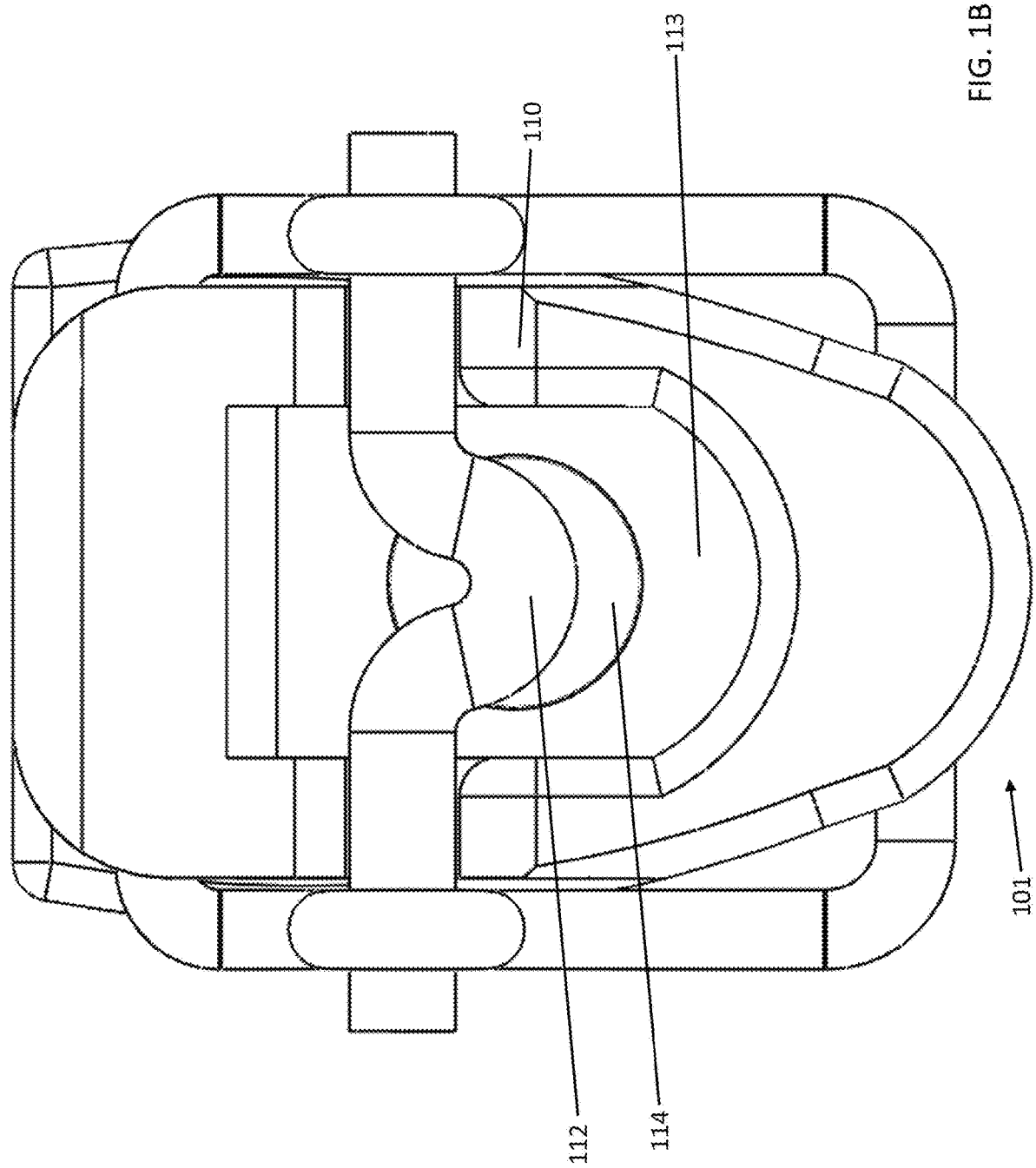

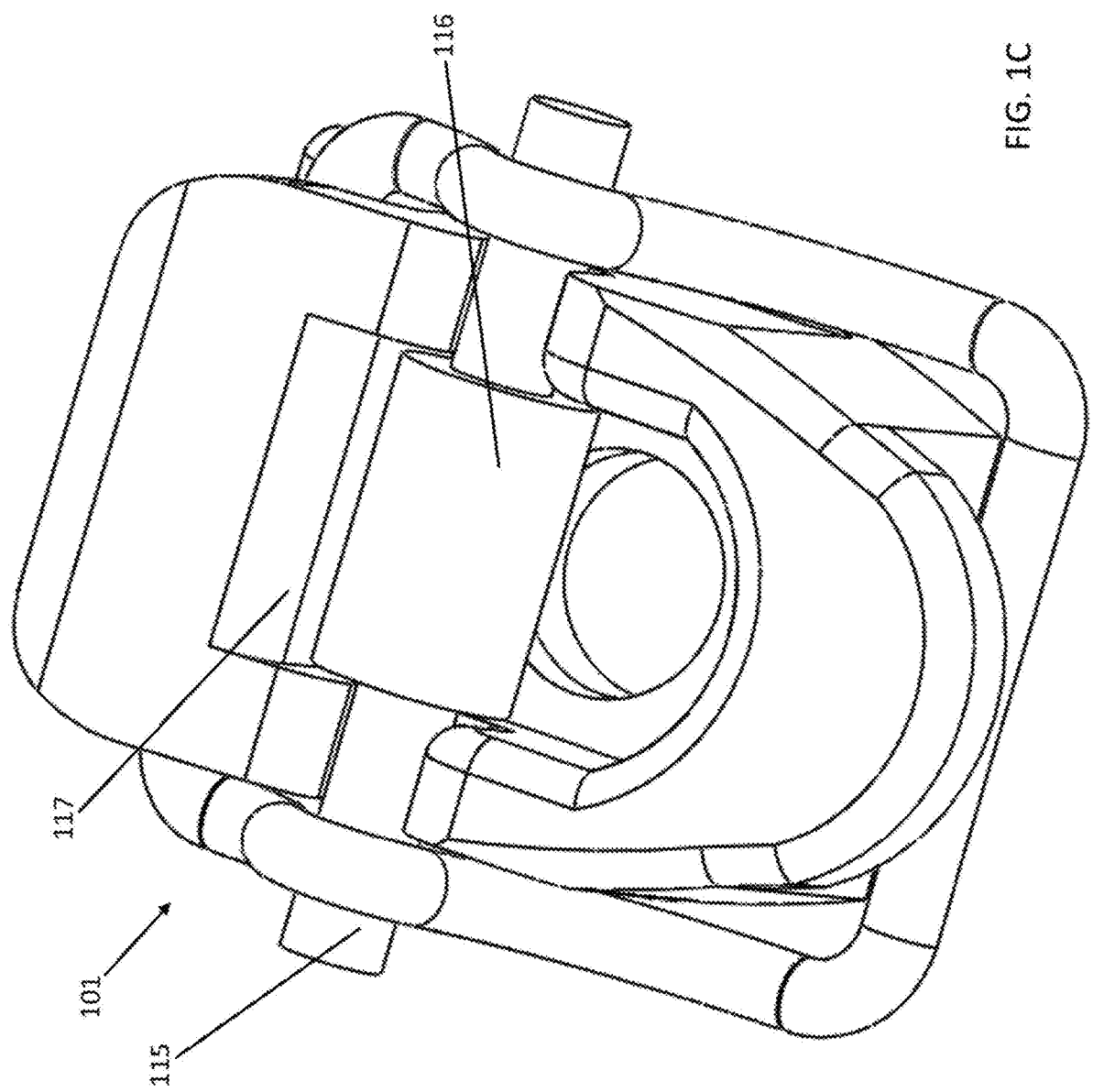

ORTHODONTIC APPLIANCE WITH NON-SLIDING, TIED ARCHWIRE

REFERENCE TO RELATED APPLICATIONS

This application is a continuation of U.S. application Ser. No. 15/490,278, filed Apr. 18, 2017, which application claims the benefit under 35 U.S.C. § 119(e) as a nonprovisional of U.S. Prov. App. No. 62/324,265 filed on Apr. 18, 2016, which are hereby incorporated by reference in their entireties.

BACKGROUND

Field of the Invention

This invention relates in some aspects to orthodontic appliances, including orthodontic brackets and archwires.

SUMMARY

In some embodiments, disclosed herein is an archwire with multiple male fasteners and multiple orthodontic brackets. Each orthodontic bracket may be bonded in any orientation to a tooth and can be attached to the male fastener on the archwire through, for example, ties. This orthodontic appliance may not rely on sliding mechanics since the male fastener may not slide with respect to the orthodontic bracket after being tied into place. The male fastener may be unlocked by untying or otherwise disassociating the male fastener from the orthodontic bracket.

In some embodiments, each male fastener may include a male loop or kink with a teardrop, U, V, rectangular shape, or other shape and/or may or may not be an essential part of the archwire. The male fastener can also be a straight wire with an attached tube in some embodiments.

Interproximal structures including loops or bends may be used between, for example, male loops on the archwire. In some embodiments, an interproximal structure, such as a loop is present between each and every male loop or kink. The interproximal loops or bends may be placed in any orientation with respect to the male loops. In some embodiments, the interproximal loops are offset, such as entirely offset from the curvature of the archwire.

In some embodiments, each orthodontic bracket may include a channel in which the male fastener may be inserted into. The walls of the channel may restrict the male fastener from moving laterally after being tied into place. The ceiling of the channel may help with torque control around the mesial-distal axis of the archwire.

In some embodiments, each orthodontic bracket may have a slot in which the archwire legs are placed. The walls of the slot may prevent the male fastener from moving occlusal-gingivally after being tied in place.

In some embodiments, each orthodontic bracket can include tie wings on both the occlusal and gingival sides of the bracket which may hold a tie in place. Each tie may be made of any material, such as metal or elastic (e.g., a ligature wire), that may hold the archwire in place. In some embodiments, each orthodontic bracket may include one, two, or more stop surfaces that prevents the male fastener's loop shape from collapsing. In some embodiments, each orthodontic bracket may include one, two, or more apertures to provide more surface area for bonding, improving retention. In some embodiments, each orthodontic bracket may include a base to improve retention for bonding. The base may be extended to the length of the tie wings in order to prevent adhesive from being placed on the tie wings.

In some embodiments, disclosed herein is an orthodontic bracket that can include an incisal tie wing comprising a plurality of legs extending from the base and a wing surface. In some embodiments, the bracket can also include a gingival tie wing comprising a plurality of legs extending from the base and a wing surface. The bracket can also include a channel configured to house a portion of a male fastener. The mesial and distal walls of the channel can be configured to surround and prevent the male fastener from moving laterally with respect to the orthodontic bracket. The legs of the incisal tie wing and the gingival tie wing can define a portion of the channel. The wing surfaces of the incisal tie wing and the gingival tie wing can extend in opposite directions from each other.

In some embodiments, an orthodontic appliance having an archwire, orthodontic brackets, and ties is disclosed. The archwire includes multiple male fasteners and interproximal loops. The male fasteners are configured to be inserted into the orthodontic brackets and tied into place.

Each male fastener may be unable to slide relative to the orthodontic bracket and may include one or more loops or kinks with any shape and/or a tube attachments to a straight wire. The interproximal loops may be any shape and may be oriented in any direction with respect to the adjacent male loops. Each orthodontic bracket may have a channel in which the male fastener may be inserted, wherein the mesial and distal walls of the channel are configured to surround and prevent the male fastener from moving laterally with respect to the orthodontic bracket and the ceiling and the floor of the channel are configured to assist with torque control. Each orthodontic bracket may include a plurality of tie wings in which the ties may be held in place under. Each orthodontic bracket may include an aperture configured to improve retention. Each orthodontic bracket may include a stop configured to prevent the male fastener's loop shape from collapsing.

In some embodiments, an orthodontic bracket having a base, an incisal tie wing, a gingival tie wing, and a channel is disclosed. The incisal tie wing can include a plurality of legs extending from the base and a wing surface. The gingival tie wing likewise can include a plurality of legs extending from the base and a wing surface. The channel can be configured to house a portion of a male fastener, wherein the mesial and distal walls of the channel are configured to surround and prevent the male fastener from moving laterally with respect to the orthodontic bracket. The legs of the incisal tie wing and the gingival tie wing can define a portion of the channel. The wing surfaces of the incisal tie wing and the gingival tie wing can extend in generally opposite directions from each other. The orthodontic bracket may further include a tie configured to removably secure the male fastener in place within the bracket. In some embodiments, a tie is present to secure the fastener in place, and the bracket does not include a movable springboard, snap-fit or other element configured to secure the fastener in place without a tie.

In some embodiments, an orthodontic bracket having a base, an archwire slot, and a channel is disclosed. The base is configured to be bonded to a surface of a tooth. The archwire slot has a mesial portion and a distal portion and is configured to receive a portion of an archwire. The mesial portion includes a gingival sidewall and an occlusal sidewall positioned substantially opposite each other and configured to prevent a mesial leg of an archwire from moving in an occlusal or gingival direction. The distal portion includes a gingival sidewall and an occlusal sidewall positioned substantially opposite each other and configured to prevent a distal leg of an archwire from moving in an occlusal or gingival direction. The channel is positioned between the mesial portion and the distal portion of the archwire slot and extends from the archwire slot in a direction substantially perpendicular to the archwire slot. The channel has medial and distal sidewalls and is configured to receive a male fastener portion of the archwire extending from the mesial and distal legs of the archwire.

At least a portion of the channel further may include a floor and a ceiling positioned substantially opposite each other and configured to receive the male fastener portion of the archwire so that the male fastener portion cannot freely rotate around the axis of the mesial and/or distal leg of the archwire. The channel may have an open gingival or occlusive end configured to allow the male fastener portion of the archwire to extend beyond the medial and distal sidewalls of the channel. The mesial and distal sidewalls of the channel may be separated by a distance approximately equal to a width of the male fastener along its widest portion, such that the male fastener cannot substantially move in a mesial or distal direction when inserted into the channel. The distance may be less than about 5% smaller than the width of the male fastener along its widest portion, such that the channel is configured to compress the male fastener as it is inserted into the channel. The distance may be less than about 5% larger than the width of the male fastener along its widest portion.

The orthodontic bracket may further include an aperture in a floor of the bracket configured to receive at least a portion of the male fastener. The aperture may be generally circular. The center of the aperture may not be aligned with the center of the archwire slot along the gingival-occlusal direction. The center of the aperture may be positioned either in the gingival direction beyond the gingival sidewalls of the archwire slot or in the occlusal direction beyond the occlusal sidewalls of the archwire slot. The aperture may extend through the base of the bracket.

The channel may extend in both the gingival direction and the occlusal direction. The orthodontic bracket may further include a gingival tie wing and an incisal tie wing positioned substantially opposite each other and each configured to secure a portion of a tie to the bracket. At least one of the tie wings can have a recess forming at least a portion of the channel. Both of the tie wings may have recesses forming at least a portion of the channel. The gingival tie wing may form the gingival sidewalls of the mesial and distal portions of the archwire slot. The incisal tie wing may form the occlusal sidewalls of the mesial and distal portions of the archwire slot.

The orthodontic bracket may further include a stop extending between the mesial portion and the distal portion of the archwire slot. The stop may include a mesial sidewall and a distal sidewall. The stop may have a width between the mesial sidewall and the distal sidewall less than a width of the channel between the mesial sidewall of the channel and the distal sidewall of the channel. The stop being may be configured to prevent substantial compression of the male fastener portion of the archwire within the channel. The stop may extend into the channel.

The orthodontic bracket may further include the male fastening portion of the archwire seated within the channel. The orthodontic bracket may further include a tie configured to removably secure the mesial archwire leg and the distal archwire leg within the archwire slot.

In some embodiments, an orthodontic appliance having an archwire and one or more orthodontic brackets is disclosed. The archwire is configured to engage the one or more orthodontic brackets. The archwire includes a male fastener configured to engage one of the one or more brackets. The male fastener has a mesial leg, a distal leg, and a projection between the mesial leg and the distal leg. The projection extends laterally away from a longitudinal axis of the archwire. Each of the one or more orthodontic brackets has a mesial slot, a distal slot, and a channel. The mesial slot is configured to removably secure the mesial leg of the male fastener to the bracket and prevent movement of the mesial leg in the occlusal and gingival direction relative to the bracket. The distal slot is configured to removably secure the distal leg of the male fastener to the bracket and prevent movement of the distal leg in the occlusal and gingival direction relative to the bracket. The channel is configured to receive at least a portion of the projection.

The male fastener may be a tubular attachment coupled to the archwire. The male fastener may be formed by bends in the archwire and the projection may include a mesial projection extending from the mesial leg, a distal projection extending from the distal leg, and a bend adjoining the distal projection and the mesial projection. The male fastener may have a teardrop shape wherein the mesial projection and the distal projection diverge away from each other as they extend from the mesial leg and the distal leg to the adjoining bend. The male fastener may have a V shape, wherein the mesial projection and the distal projection converge toward each other as they extend from the mesial leg and the distal leg to the adjoining bend. The male fastener may have a U shape, wherein the mesial projection and the distal projection extend substantially parallel to each other as they extend from the mesial leg and the distal leg to the adjoining bend. The archwire bends forming the male fastener may all be formed in the same plane.

The male fastener may be configured to be removably engaged with one of the one or more brackets in a manner that prevents the archwire and bracket from sliding relative to one another. The male fastener may be configured to exert a torque around a longitudinal axis of the mesial leg and distal leg of the archwire to one of the one or more brackets. The male fastener may be configured to exert a force in a substantially mesial or distal direction on one of the one or more brackets. The male fastener may be configured to exert a torque on one of the one or more brackets around an axis extending along a gingival to occlusal direction. The male fastener may be configured to exert a torque on one of the one or more brackets around an axis extending along a buccal to lingual direction. The male fastener may be configured to exert a translational force on one of the one or more brackets in any of three orthogonal directions and configured to exert a torque on the bracket around any of three orthogonal axes.

The channel may include a ceiling and a floor, wherein a portion of the male fastener is configured to be received between the ceiling and the floor. The channel may include an aperture in a floor of the channel configured to removably retain the adjoining bend of the male fastener.

The archwire may have a generally circular cross-section. The archwire may include more than one male fastener. Each of the one or more brackets may include a tie configured to removably secure the mesial leg and the distal leg of the male fastener to the bracket. The archwire may have one or more interproximal loops configured to be placed adjacent one of the one or more brackets for exerting a force the bracket.

In some embodiments, a method of orthodontically moving teeth is disclosed, comprising providing a plurality of brackets and attaching the plurality of brackets to each tooth of a dental arch. Each bracket has a mesial slot, a distal slot, and a channel. The mesial slot is configured to removably secure a mesial leg of a male fastener of an archwire configured to follow a dental arch to the bracket and prevent movement of the mesial leg in the occlusal and gingival direction relative to the bracket. The distal slot is configured to removably secure a distal leg of the male fastener to the bracket and prevent movement of the distal leg in the occlusal and gingival direction relative to the bracket. The channel is configured to receive at least a portion of a projection of the male fastener between the mesial leg and the distal leg. The method further comprises connecting the plurality of fasteners of the archwire configured to follow the dental arch to respective brackets. The archwire includes interproximal structures between each and every one of the plurality of fasteners. Each of the plurality of fasteners corresponds to a single bracket of the plurality of brackets. The method further comprises tying the archwire to the brackets to secure the archwires to the brackets. After securing, the archwires are unable to slide with respect to the brackets, thereby causing the teeth to move solely by force resulting from movement of the interproximal structures of the archwire in between the brackets. The method may further comprise untying the archwire from the brackets.

BRIEF DESCRIPTION OF THE DRAWINGS

These drawings are illustrative embodiments and do not present all possible embodiments of this invention.

FIGS. 1A, 1B, and 1C illustrate an embodiment of an orthodontic bracket with different male fasteners tied into place. FIG. 1A illustrates a teardrop shaped male fastener in an angled view. FIG. 1B illustrates a V-shaped kink male fastener in the top view, and FIG. 1C illustrates a straight wire with an attached tube as the male fastener in the angled view.

FIG. 2A illustrates a U shaped male fastener tied into place shown in an angled view. FIG. 2B illustrates the orthodontic bracket by itself in the top view.

DETAILED DESCRIPTION

Figure 1A:
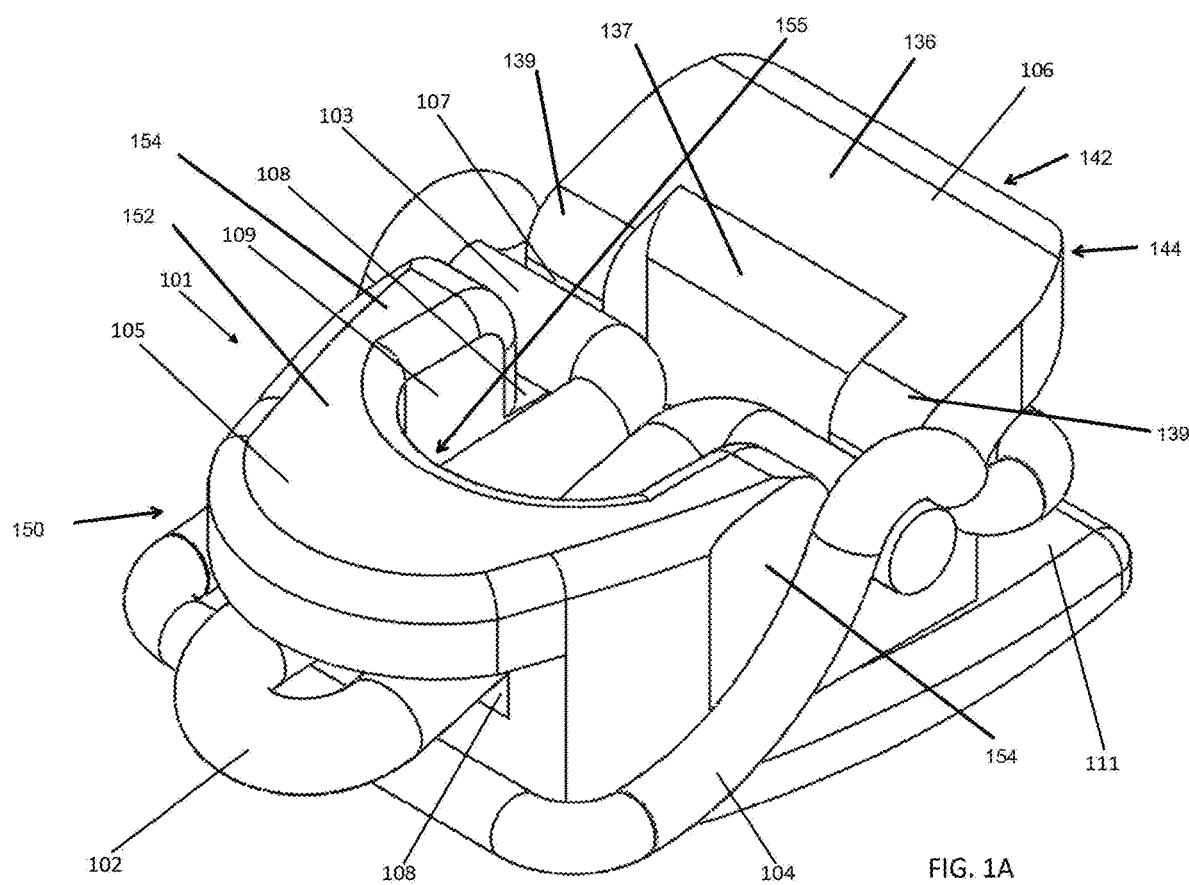

Orthodontic appliances are used to correct malocclusion of the teeth. While there are several types of orthodontic appliances, each have their own potential drawbacks such as, for example, large time requirements to prepare and/or install, inefficient tooth movement, or susceptibility to fracture. Orthodontic appliances generally include brackets bonded to individual teeth and an archwire adjoining the brackets for exerting forces between the teeth to bring them into proper alignment. In some embodiments, the connection between the archwire and each bracket would allow control over the force applied to the tooth in all three dimensions. For example, a bracket can in some cases be able to exert on the tooth a translational force along and/or a torque around the gingival-occlusal direction, the medial-distal direction, and/or the buccal-lingual direction. The inability of many conventional brackets and archwire appliances to effectively control motion in all three dimensions is a shortcoming resolved by various embodiments disclosed herein.

The edgewise appliance is an orthodontic bracket that contains a rectangular slot in which a rectangular archwire can be inserted. The rectangular configuration of the archwire and bracket slot can allow the rotation of the archwire around its longitudinal axis (generally aligned along the medial-distal direction) to exert torque on the bracket and, hence, the tooth the bracket is bonded too. The torque exerted may be used to facilitate correcting the malocclusion. The edgewise appliance is bonded to each tooth. The edgewise appliance can have, for example, the following drawbacks:

The edgewise appliance system relies on sliding mechanics between the orthodontic bracket and archwire to align teeth. A drawback of sliding mechanics is the friction that occurs between the bracket and archwire, including the friction between the archwire and ligation tie. The amount of friction that has to be overcome is inconsistent from bracket to bracket, so both overcorrection and under-correction are common. Thus, monthly appointments can be necessary to correct the errors in tooth movement due to friction.

Custom wire bending along three axes, which can be time consuming, is often needed for the edgewise appliance due to differences in tooth position and size.

The pre-adjusted, straight-wire appliance is another type of orthodontic appliance. This appliance uses a nickel-titanium, shape memory archwire which can deliver lighter forces than stainless steel wires. Use of nickel-titanium archwires can reduce the amount of archwire bending, decrease pathological lesions which may occur due to heavy forces, reduce the number of archwires required for treatment, and minimize the number of appointments needed. However, the pre-adjusted, straight-wire appliance can present, for example, with the following drawbacks:

This appliance also requires the archwire to be tied to the bracket which can be in some cases time consuming, especially for lingual braces.

This appliance also depends on sliding mechanics to move the teeth which produces inconstant amounts of friction that must be overcome. Monthly appointments are necessary to correct any errors in tooth alignment due to friction.

Self-ligating brackets are another type of orthodontic appliance which uses movable parts in the form of a door or latch to hold the archwire in place. This door or latch replaces the need to tie the archwire and may improve the ease of use of delivering and changing archwires. However, self-ligating brackets can present, for example, with the following drawbacks:

This appliance also depends on sliding mechanics resulting in unpredictable amounts of friction that must be overcome. Friction levels may be lower due to the metal-to-metal interface. Monthly appointments are still necessary to correct any errors in tooth movement due to friction.

The moving parts that this appliance relies on are susceptible to fracture from occlusal forces or normal use over time in the mouth.

This appliance may be bulkier which results in decreased interdental space between brackets. This can reduce the control of tooth movement since it requires the use of a more rigid wire.

This appliance may have a high degree of orthodontic slop between the slot and archwire. This results in reduced torque control.

CAD/CAM technology can be used to generate customized archwires and/or orthodontic brackets based on an optimal, predetermined orthodontic treatment goal. This can decrease the number of appointments and custom wire bending performed by the doctor. However, CAD/CAM technology may present, for example, with the following drawbacks:

Customized appliances may depend on sliding mechanics which generate unpredictable levels of friction that must be overcome. Monthly appointments are still required to correct any errors in tooth movement due to friction.

Customized appliances may require the archwire to be tied to the orthodontic bracket which may be time consuming, especially for lingual braces.

Customized self-ligating appliances contain all the drawbacks of conventional self-ligating brackets.

The pin and tube appliance is an orthodontic appliance that uses an orthodontic archwire with a male "pin" inserted into a female vertical "tube." The pin and tube are attached to the tooth and do not rely on sliding mechanics. Interproximal loops may be used to open and close spaces. The following drawbacks may, for example, present with the pin and tube appliance:

This appliance may need custom interdental loops and archwire bends in order for the pin to fit into the tube. This process may be technically difficult, time consuming, and tedious.

It may be technically challenging to insert or remove the archwire due to this locking mechanism, making this a potentially time consuming process to deliver or change archwires.

The male pin may be soldered to the archwire with inclination. The pin may need to be unsoldered and re-soldered as the teeth move. This would be a time consuming process, and the solder joint is an area susceptible to fracture.

This appliance may have difficulty performing axial rotations of teeth. For example, the pin and/or tube may have round (e.g., cylindrical) configurations that make it difficult for the pin to effectively transfer torque around the axis of the pin to the tube and, hence, to the bracket. The pin may freely rotate within the tube. Even if non-circular geometries are used, the juncture between the archwire and the pin, especially since the pin is likely soldered to the archwire, may not be suitable for transferring sufficient amounts of torque from the archwire through the small-diameter pin. Therefore, this appliance may be severely limited in controlling motion in at least one plane of direction.

FIGS. 1A, 1B, and 1C illustrate views of an embodiment of an orthodontic bracket 101. FIG. 1A illustrates an angled view which includes a generally cylindrical archwire comprising a male fastener with a teardrop shape 102 with archwire legs 103. Each male fastener 102 may be configured into any shape such as, for example, a teardrop, U, or rectangular shape. The male fastener can generally include a projection formed by one or more bends (e.g., three bends) in the archwire, the projection extending in a direction generally perpendicular to the longitudinal axis of the archwire legs 103 to a lateral point off the archwire's longitudinal axis. The lateral point can be formed by one of the bends. The bends may be of different curvatures (e.g., some sharper than others and/or with different arc lengths). In some embodiments, the male fastener 102 is essentially two-dimensional, such that the one or more bends forming the male fastener are all formed in the same plane, as shown in FIG. 1A, so that the male fastener 102 lies in the same plane as the archwire legs 103. In other embodiments, the male fastener 102 may be essentially three-dimensional. For example, the projection of the male fastener 102 may bend (e.g., gradually) out of plane with the archwire legs 103 as it extends to a lateral point. The medial and distal archwire projections of the male fastener may remain parallel or may diverge out of plane with each other as they extend toward a lateral point. In some embodiments, the medial and distal halves of the male fastener 102 may be symmetric, as shown in FIGS. 1A-3. In other embodiments, the medial and distal halves may be asymmetric. A teardrop-shaped male fastener 102 can include a projection that widens as it extends to a rounded lateral point. The medial and distal archwire legs 103 may come into contact with each other as the archwire bends outward to form the male fastener 102. In some embodiments, the archwire legs 103 are pushed toward each (e.g., into contact with each other) as the male fastener 102 engages the bracket. The medial and distal archwire projections may diverge away from each other as they extend toward the lateral point.

The male fastener 102 can be removably attached to the bracket 101, such as tied into place with a tie 104. The tie 104 may include any material, such as metal or elastic, which has the capability to hold the male fastener 102 to the orthodontic bracket 101. The tie 104 can be held into place by the gingival tie wing 105 and the incisal tie wing 106, which can form the superior-most (upper-most or most anterior) portions of the bracket 101 as illustrated and can be operably connected posteriorly to the base 111 of the bracket 101. The tie wings 105, 106 can include in some embodiments a plurality of laterally spaced-apart legs (incisal tie wing legs 139 and gingival tie wing legs 154) extending from the base 111 of the bracket 101 and away from a plane of the non-tooth facing surface of the base 111 of the bracket 101 as shown. The plurality of legs of the respective tie wings can be connected together by a bridge segment connecting, such as continuously connecting in an uninterrupted segment, and/or integrally formed with both of the legs of the tie wings, that can be flange-like as illustrated and extend in gingival or incisal directions with respect to the lateral legs of the respective tie wings. Illustrated is the bridge 136 of the incisal tie wing 106 and the bridge 152 of gingival tie wing 105. In some embodiments, the bridge segments span between the lateral legs of the tie wings but the legs of the tie wings are the only parts of the tie wings that are in actual contact with the base 111 of the bracket 101. In some embodiments, the bridge segments extend to, or past (or include incisal-most peripheral edge 142 and/or gingival-most peripheral edge 150) the gingival-most peripheral edge or incisal-most peripheral edge of the base 111 of the bracket 101. In some embodiments, the incisal tie wing 106 (and/or the gingival tie wing 105) can have a relatively straight edge (but can have rounded corners 144 as illustrated, or sharp corners in other embodiments) and an edge also with a relatively straight edge (e.g., gingival-facing edge 137) opposite the relatively straight edge and in between the legs of the tie wing 106 (e.g., the bridge portion), while the gingival tie wing 105 can have a relatively curved peripheral edge 150 as illustrated and an incisal-facing edge 155 that can also be curved, and opposite the relatively curved gingival-most edge 150 and in between the legs 154 of the tie wing as shown. The relatively straight edge of the incisal tie wing 106 can be configured to cover the tie 104. The relatively curved edge of the gingival tie wing 105 can be configured to cover the tie 104 and/or the lateral point of the male fastener 102, as shown in FIG. 1A. The recess of the gingival tie wing 105 may be configured to facilitate the insertion of the male fastener 102 into the orthodontic bracket 101. In some embodiments, the incisal tie wing 106 and the gingival tie wing 105 have the same or a similar geometry to each other, but just extending in opposite directions from the legs of the tie wings. However, in some embodiments as illustrated the tie wings 105, 106 have distinctly different shapes/configurations. In some embodiments, the length of the bridge of a tie wing can be about or at least about 1×, 1.25×, 1.5×, 1.75×, 2×, 2.25×, 2.5×, 2.5×, 3×, 4×, 5×, or more of the width of the tie wing and/or the length, width, and/or height of the legs of the tie wings.

The archwire legs 103 sit in the bracket slot 107 which can have a raised slot floor 108. In other embodiments, the slot floor 108 may be contiguous with the floor of the orthodontic bracket 101, which can be formed by the anterior surface of the base 111. The tie 104 can be secured over the top of the archwire legs 103 holding the legs 103 within the slot 107. The tie 104 and floor 108 of the bracket slot 107 prevents buccal-lingual movement of the archwire legs 103. The archwire can exert anterior translational movement on the bracket 101 and underlying tooth by applying force to the tie 104. The archwire can exert posterior translational movement on the bracket 101 and underlying tooth by applying force to the slot floor 108 and/or bracket floor. When one of the mesial and distal archwire legs 103 exerts an anterior force against the tie 104 and the other exerts a posterior force against the slot floor 108, a torque around a gingival-occlusal axis can be applied to the bracket 101 and underlying tooth. In some embodiments, a portion of the fastener 102, such as the most gingival end of a loop that changes direction (e.g., the U or V of the fastener loop) can be exposed and not covered by the bracket 101 as illustrated. In some embodiments, the bracket 101 or portions thereof including the walls of the gingival tie wing 105 and/or incisal tie wing 106 that can define or help define the walls of the bracket channel 109 configured to come into contact with the male fastener 102 are fixed (not movable) and do not include movable structures such as a detent or tang. However, in some embodiments some walls 109 of the bracket channel can be movable and exert a force, e.g., a radial inward force on the fastener 102 when positioned into the bracket 101.

The walls of the bracket slot 107 can prevent the male fastener 102 from moving occlusal-gingivally. Through the interaction between the archwire legs 103 and the walls of the slot 107, the archwire can exert force on the bracket 101 and tooth in at least one plane of direction. When both the mesial and distal archwire legs 103 are biased to exert a force in either an occlusal or a gingival direction, the bracket 101 and underlying tooth may be urged in the same direction. When the archwire legs 103 are biased in opposite directions, one in the occlusal direction and one in the gingival direction, a torque can be exerted around a buccal-lingual axis of the bracket, which can be transferred to the underlying tooth. The direction of the torque will depend on which of the medial and distal archwire legs 103 is biased in an occlusal direction and which is biased in a gingival direction. In various implementations, the archwire will not be biased in a purely gingival or occlusal direction, but will be biased in a mesial or distal direction as well. The non-sliding mechanics of the bracket 101 can therefore assist in applying the torque by stabilizing the archwire legs 103 within the bracket slot 107. Archwire male loops may be removed and replaced with stops, eyelets, indentations, or any type of protuberance on the mesial and distal aspects of the orthodontic bracket 101. These protuberances may act as stops to prevent the archwire from sliding.

An archwire may be activated by deflecting it away from its default position and inserting into a position within an orthodontic bracket that is bonded to a tooth. When this elastic deflection occurs, the archwire may exert a reaction force in the direction that returns the archwire to the designed configuration, thereby transferring forces to the tooth and causing orthodontic tooth movement. This archwire activation may completely control any tooth movement in three-dimensional space. For mesio-distal tooth movement, if there is space between adjacent teeth, securing an archwire into an orthodontic bracket may cause an interproximal structure to open, which may cause the archwire to be activated, leading to closing of space in the mesial-distal direction. Whereas, if there is overlap between adjacent teeth, archwire securement into an orthodontic bracket may cause an interproximal structure to close, which may cause the archwire also to be activated, this time leading to opening of space in the mesial-distal direction. For occlusal-gingival tooth movement, if the adjacent teeth are not at the same level, an archwire fitting into an orthodontic bracket may cause connecting archwire legs and interproximal loops to deflect in a slanted manner which may cause the archwire to be activated, leading to tooth correction in the occlusal-gingival direction. For facio-lingual tooth movement, archwire fitting into an orthodontic bracket may cause the wire to be pushed away from its original position which may cause the archwire to be activated, leading to tooth correction in the facio-lingual direction.

The archwire male fastener teardrop loop 102 or other configuration can be inserted into the orthodontic bracket channel 109. The channel 109 can include the gingival tie wing 105 recess and additionally extends from the recess beneath the superficial surface of the gingival tie wing 105. In some embodiments, the channel 109 may extend through the gingival tie wing 105 (between the legs of the tie wing 105) to open to the gingival end of the bracket 101, as shown in FIG. 1A, such that a loop end or the lateral point of the male fastener 102 does not engage a gingival surface of the bracket 101. The mesial and distal walls of the channel 109 and the orthodontic bracket walls 110 (which may form the mesial and distal walls of the channel 109) prevent lateral movement of the male fastener 102 with respect to the orthodontic bracket 101. As such, the bracket 101 can be configured for use with orthodontic appliances that do not rely on sliding mechanics. In some embodiments, the legs of the tie wings 105, 106 define a portion of the walls of the channel 109 as illustrated. Because sliding mechanics are not involved in some embodiments, the archwire can exert mesial and/or distal translational forces on the bracket without the need for a certain degree of friction between the archwire and the bracket 101 and tie 104. In some implementations, the force exerted by the male fastener 102 on the mesial or distal walls of the channel 109 may assist in exerting a torque on the bracket 101 around a buccal-lingual axis.

The ceiling and the floor of the channel 109 can be configured to assist with torque control. The ceiling and the floor of the channel 109 help secure the male fastener 102 within the bracket 101. The channel 109 may be dimensioned to receive the male fastener. The width of the channel 109 may be approximately the same as the widest portion of the male fastener 102 such that they essentially form an interference fit or the channel 109 may be just slightly wider, such as less than about 20%, 15%, 10%, 5%, 4%, 3%, 2%, or 1% wider than the male fastener 102. The width of the channel 109 may be slightly smaller than the width of the male fastener 102, such as no more than about 20%, 15%, 10%, 5%, 4%, 3%, 2%, 1%, or less smaller than the width of the male fastener 102, where the loop portion of the male fastener 102 is configured to be compressed by the walls of the channel 109. The ceiling and floor may be separated a distance substantially the same as the thickness of the archwire in embodiments where the male fastener 102 is essentially two-dimensional, as shown in FIG. 1A. The ceiling and floor of the channel 109 can prevent movement of the male fastener 102 in the buccal-lingual direction (the anterior-posterior direction of the bracket 101) with respect to the bracket 101. The tie 104 and slot floor 108 prevent the archwire legs from moving in a buccal-lingual direction with respect to the bracket 101. Therefore, a torque applied along the longitudinal axis of the archwire legs 103 (around a mesial-distal axis) can be transferred to the bracket 101 through the interaction of the male fastener 102 with either the floor or ceiling of the channel 109. The interaction of the male fastener 102 with the floor or ceiling will urge the bracket 101 and underlying tooth to rotate around the axis of the archwire legs 103. Embodiments where the male fastener 102 lies within the same plane as the archwire legs 103 (and the ceiling and floor of the bracket 101) may be especially suitable for applying torque in this direction, as the surface area of the male fastener 102 pressed against the ceiling or floor under the applied torque can be maximized. In embodiments where the channel 109 allows some space between the male fastener 102 and the ceiling and/or floor of the channel 109, the archwire legs 103 may be able to rotate beneath the tie 104 under an exerted archwire torque until the male fastener 102 comes into contact with either the ceiling or the floor so that the torque may be transferred through that surface. Advantageously in some embodiments, because the torque is transferred from the archwire to the bracket 101 through the male fastener 102 and not simply through the edges of the archwire legs 103 to the walls of the bracket slot 107, a non-rectangular (e.g. a round) archwire can be employed within the bracket 101. Use of a round archwire can reduce the design restraints and periodic adjustments required for conventional edgewise orthodontic appliances.

The orthodontic bracket base 111 can add surface area increasing retention of the bracket 101 to the underlying tooth and may extend to the length of the tie wings 105, 106 to prevent adhesive from being placed on the tie wings 105, 106. In some embodiments, portions of the tie 104 may extend posterior to (under) the loop 102 of the fastener as well as the tie wings 105, 106, while extending anterior to (over) the legs 103 of the fastener as shown. In some embodiments, the tie wings 105, 106 include a plurality of legs and surfaces that extend in generally opposite directions from their respective legs.

FIG. 1B illustrates the top view of orthodontic bracket 101 which contains an archwire male fastener with a substantially V-shaped kink 112. The V-shaped kink 112 can include medial and distal projections that extend away from the archwire legs and toward each other until they meet at a lateral point. The V-shaped kink 112 can be formed as a continuous bend or a single kink in the archwire. The V-shaped kink 112 may be symmetric, as shown in FIG. 1B, or may be asymmetric. The V-shaped kink 112 can be essentially two-dimensional, formed in the same plane as the archwire legs. The projections of the V-shaped kink 112 may extend a length less than the projections of the teardrop-shaped male fastener 102. The male fastener can be prevented from lateral movement by the orthodontic bracket walls 110, which may be the same size or just slightly larger than the outer diameter of the male fastener. In some embodiments, this design does not engage the orthodontic bracket channel 109, so it may lack torque control around a mesial-distal axis. The male fastener 112 sits on the floor 113 of the orthodontic bracket 101. An aperture 114 may be placed in the bracket floor 113 to aid in retention of the male fastener 112.

The aperture 114 may extend through the base of the bracket 101 or may form a closed-ended channel extending into the base of the bracket 101. The aperture 114 may be circular in shape, as shown in FIG. 1B, or may be any other suitable shape (e.g., square, diamond, polygonal, oblong, etc.). The center of the aperture 114 may be positioned more toward the gingival end of the bracket 101 (defined by the gingival tie wing 105) than the center of the bracket slot 107. The center of the aperture 114 may be positioned beyond the gingival sidewall of the bracket slot 107. The shape, size, and/or positioning of the aperture 114 can be configured to allow retention of the male fastener 112. For example, the aperture 114 may securely retain the male fastener 112 when the male fastener 112 intercepts the plane of the aperture 114 such that the outer width of the male fastener 112 forms a chord across the plane of the aperture 114. In inserting the male fastener 112, the male fastener 112 can be rotated around the axis of the archwire legs so that the male fastener 112 intercepts the aperture 114 at a steeper angle and along a more occlusal chord of the aperture 114, causing the male fastener 112 to extend deeper into the aperture 114. A male fastener with a continuously decreasing outer width, such as the V-shaped kink 112 shown in FIG. 1B, may be especially suitable in some embodiments for retention within the aperture 114. As the V-shaped kink 112 is rotated around the axis of the archwire legs 103, the width of the V-shaped kink 112 along the plane of intercept with the aperture 114 increases while the length of the chord along the plane of intercept decreases. Therefore, the V-shaped kink 112 can be rotated until the width approximately matches the length of the chord. In some embodiments, the V-shaped kink 112 may be formed with some compressibility such that the male fastener may be inserted deeper into the aperture 114 than the point where the width of the fastener matches that of the chord, which may compress the male fastener reducing its outer width. The elastic force of the compressed male fastener 112 exerted against the sidewalls of the aperture 114 may facilitate retention of the male fastener 112 within the aperture 114. When secured within the aperture 114, the male fastener 112 is prevented from moving laterally in a mesial or distal direction. Similar to embodiments where the bracket channel 109 secures the male fastener 102, the aperture 114 can allow the exertion of mesial or distal translational forces by the archwire on the bracket 101 and underlying tooth via non-sliding mechanics. The archwire may also be configured to exert a torque in a first direction around the mesial-distal axis of the archwire legs by applying a rotational force to the male fastener 112 further toward the gingival direction after it is secured within the aperture 114. The male fastener 112 may be inserted a maximal depth into the aperture 114 after which the torque may be transferred through the sidewalls of the aperture 114 to the bracket 101. In some implementations, the male fastener 112 may be secured within the aperture 114 such that a threshold amount of force is needed to remove the male fastener 112 from the aperture (e.g., by rotating the male fastener 112 out of the aperture 114). In such cases, the male fastener 112 may be capable of exerting a degree of torque in a second direction around the mesial-distal axis of the archwire legs by transferring the force through the sidewalls of the aperture 114.

FIG. 1C illustrates an angled view of orthodontic bracket 101 which contains a straight archwire male fastener 115 that has a central element having a larger diameter than portions of the fastener 115 bordering the central element, such as an added tube attachment 116. The tube attachment 116 may be attached to the straight archwire male fastener 115 by any mechanism (crimp-on, glue-on, soldering, welding, etc.) and sits in the tube attachment groove 117 formed in the incisal tie wing 106. This groove 117 prevents lateral movement of the male fastener 115 with respect to the orthodontic bracket 101. The raised floor 108 of the orthodontic bracket slot 107 in some embodiments can help prevent the male fastener 115 from moving laterally relative to the orthodontic bracket 101 by forming a step with the bracket floor 113 against which the tube attachment 116 may abut. The sidewalls of the bracket channel 109 can help prevent the male fastener 115 from moving laterally relative to the orthodontic bracket 101. The tube attachment 116 may be cylindrical, as shown in FIG. 1C, or it may be any other suitable shape. For example, the tube attachment 116 may have a polygonal cross-section (e.g., rectangular, pentagonal, octagonal, etc.). This male fastener 115 does not engage the orthodontic bracket channel 109 in some embodiments, so it may lack torque control around the mesial-distal axis of the archwire. In some embodiments, the tube attachment 116 may be configured with a shape that corresponds to a shape formed by the tube attachment groove 117 such that the tube attachment does not readily rotate around the mesial-distal axis when engaged with the tube attachment groove 117. This configuration may allow exertion of torque in one or both directions around the mesial-distal axis, similar to the way in which conventional edgewise orthodontic appliances apply torque using a rectangular archwire in a rectangular bracket slot. In some implementations, the brackets 101 disclosed herein may be used with non-round archwires, such as rectangular archwires, in addition to round archwires. When used with a non-round archwire, the archwire may be configured to exert torque around a mesial-distal axis by pressing against the occlusal and gingival sidewalls of the bracket slot 107.

Figure 2A:
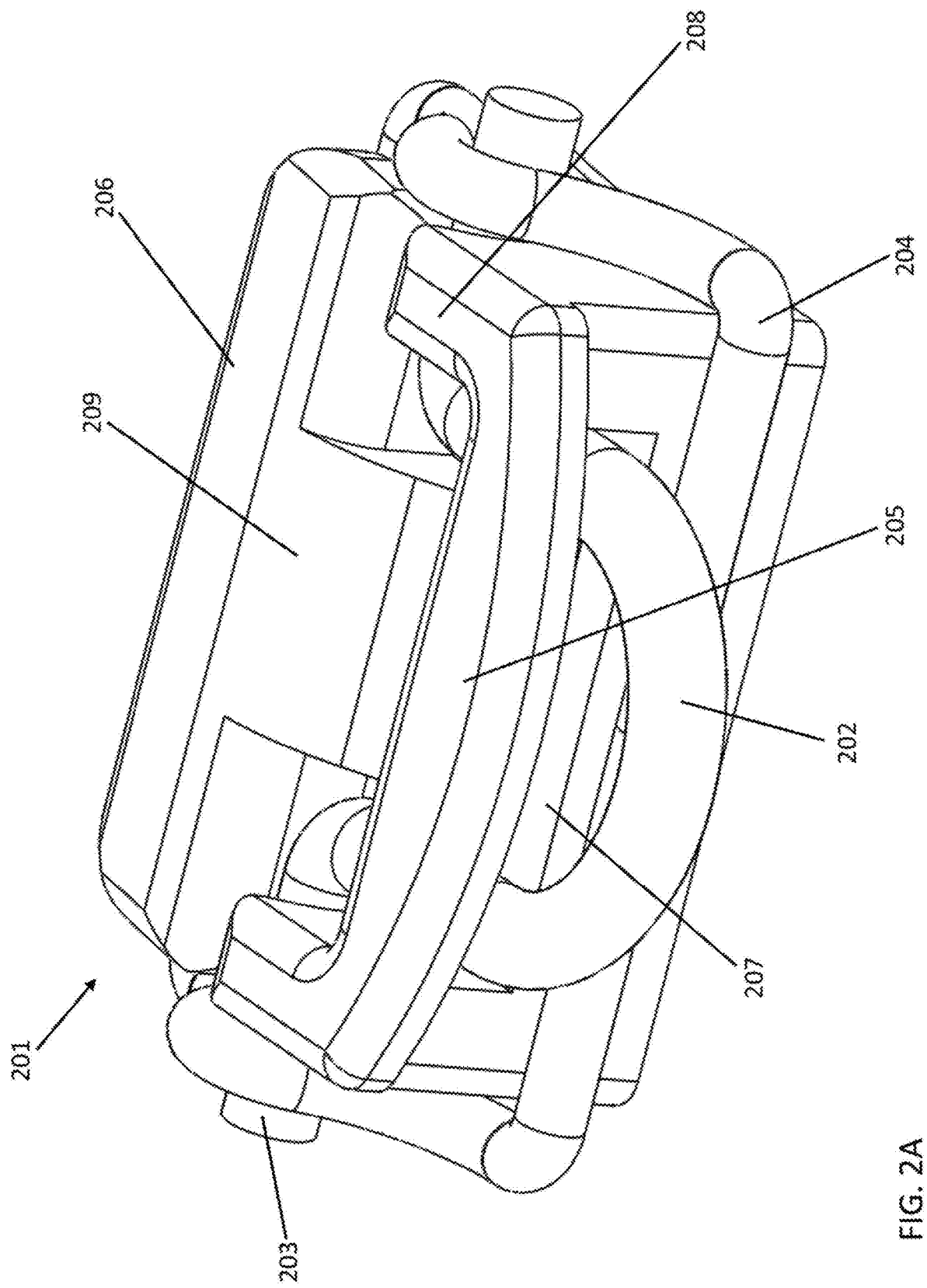
FIGS. 2A and 2B illustrate an embodiment of a different configuration of the orthodontic bracket with different dimensions and a stop that prevents the male fastener's loop shape from collapsing.

FIG. 2A illustrates an angled view of a different configuration of an orthodontic bracket 201, according to some embodiments of the invention. In this configuration, a U-shaped male fastener 202 is illustrated. The male fastener 202 may have any shape such as a U, teardrop, or rectangular shape for example. The bracket 202 may share similar features with the bracket 101 disclosed elsewhere herein. The archwire legs 203 and U-shaped male fastener 202 are tied into place with a tie 204. This tie 204 can be held into place by the gingival tie wing 205 and incisal tie wing 206. The U-shaped male fastener 202 can be placed into a channel 207. A mesial wall 220 and a distal wall 221 of the channel 207 and the orthodontic bracket walls 208 can prevent lateral movement of the male fastener with respect to the orthodontic bracket 201. The ceiling and the floor (or root) of the channel 207 can help with torque control around the mesial-distal axis of the archwire legs 203. The bracket 202 may comprise a stop 209 configured to be positioned between the mesial and distal archwire legs 203. The stop 209 may include an occlusal-facing wall 228, which can be disposed gingivally of the mesial wall 220 and the distal wall 221. The occlusal-facing wall 228 may include a mesial sidewall 222 and a distal sidewall 223. The stop 209 may include a projection 224 (e.g., a rigid projection), which can be relatively central and in between the legs of the incisal tie wing 206, and extending in a gingival direction from the incisal tie wing 206. The stop 209 may be centered along the mesial-distal length of the bracket 201. The male fastener 202 may share features with the male fasteners 102, 112 described elsewhere herein. The male fastener 202 can be configured with sufficient space between mesial and distal projections to accommodate the stop 209. For example, the U-shaped male fastener 202 shown in FIG. 2A may comprise mesial and distal projections that extend substantially perpendicular to the archwire legs 203 over a length of the male fastener 202, maintaining a substantially constant width or distance between each other until bending to converge at a lateral point.

The stop 209 can help prevent the male fastener's loop shape from collapsing. For example, when a mesial translational force is applied to the distal archwire leg 203, the distal wall of the stop 209 may abut the distal archwire leg and/or the distal projection of the male fastener 202 and prevent the distal half of the male fastener 202 from sliding toward the mesial half of the male fastener 202, compressing the male fastener 202 and causing collapse of the loop shape or bend in the process. Likewise, when a distal translational force is applied to the mesial archwire leg 203, the mesial wall of the stop 209 may abut the mesial archwire leg 203 and/or the mesial projection of the male fastener 202 and prevent the mesial half of the male fastener 202 from sliding toward the distal half of the male fastener 202.

Figure 2B:
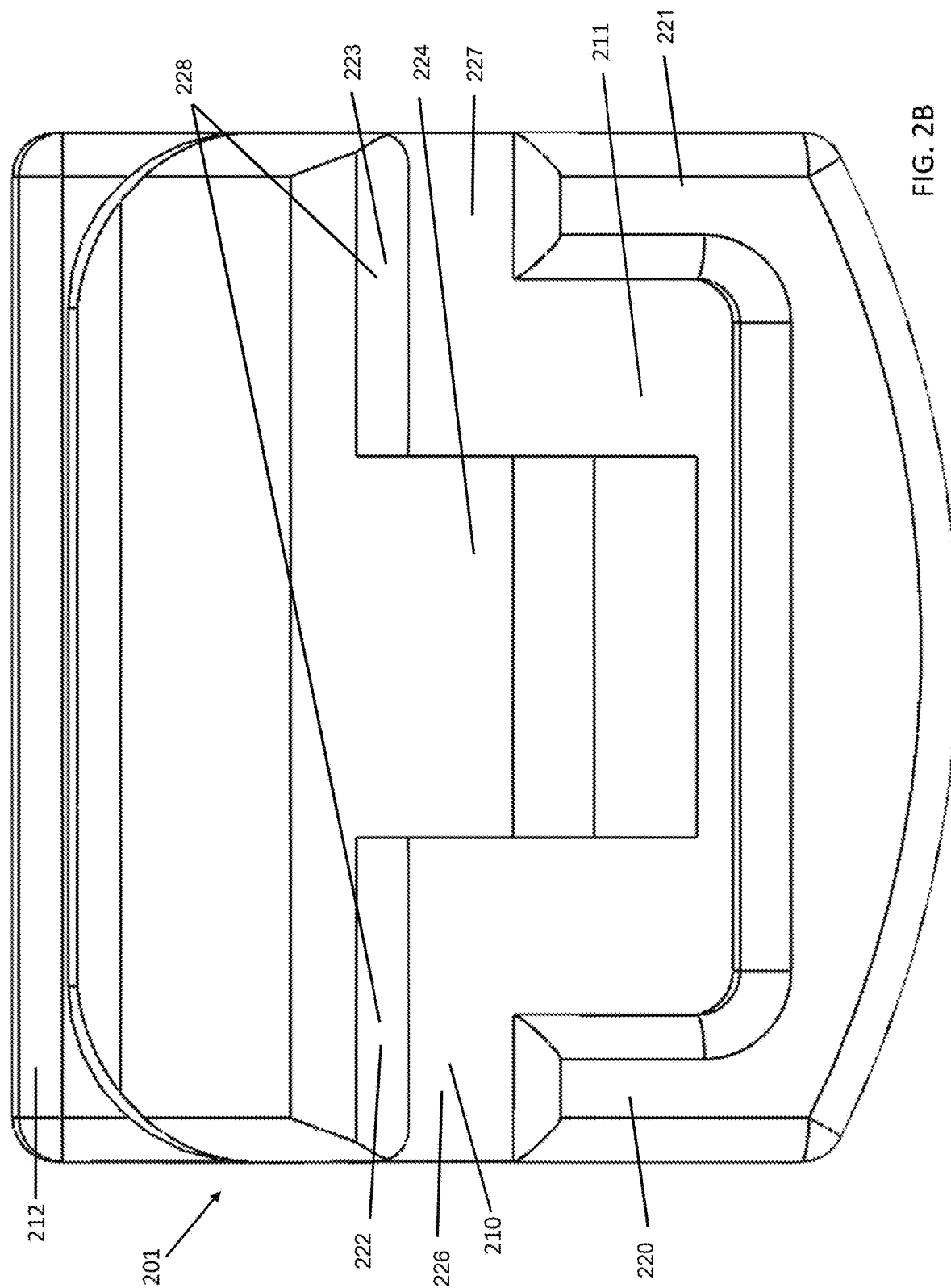

FIG. 2B illustrates the top (opposite tooth side) view of orthodontic bracket 201 without the male fastener 202 or the tie 204. The archwire legs 203 may sit in the orthodontic bracket slots 210. The orthodontic bracket slots 210 can include a mesial slot 226 and/or a distal slot 227. The male fastener 202 sits on the floor of the orthodontic bracket 211. The bracket floor 211 may be contiguous with the floors of the bracket slots 210. The combined floor space may form a substantially U-shaped chamber configured for receiving and securing a U-shaped male fastener 202. The orthodontic bracket base 212 adds surface area increasing retention of the bracket 202 to the underlying tooth and may extend to the length of the tie wings to prevent adhesive from being placed on the tie wings.

Figure 3:
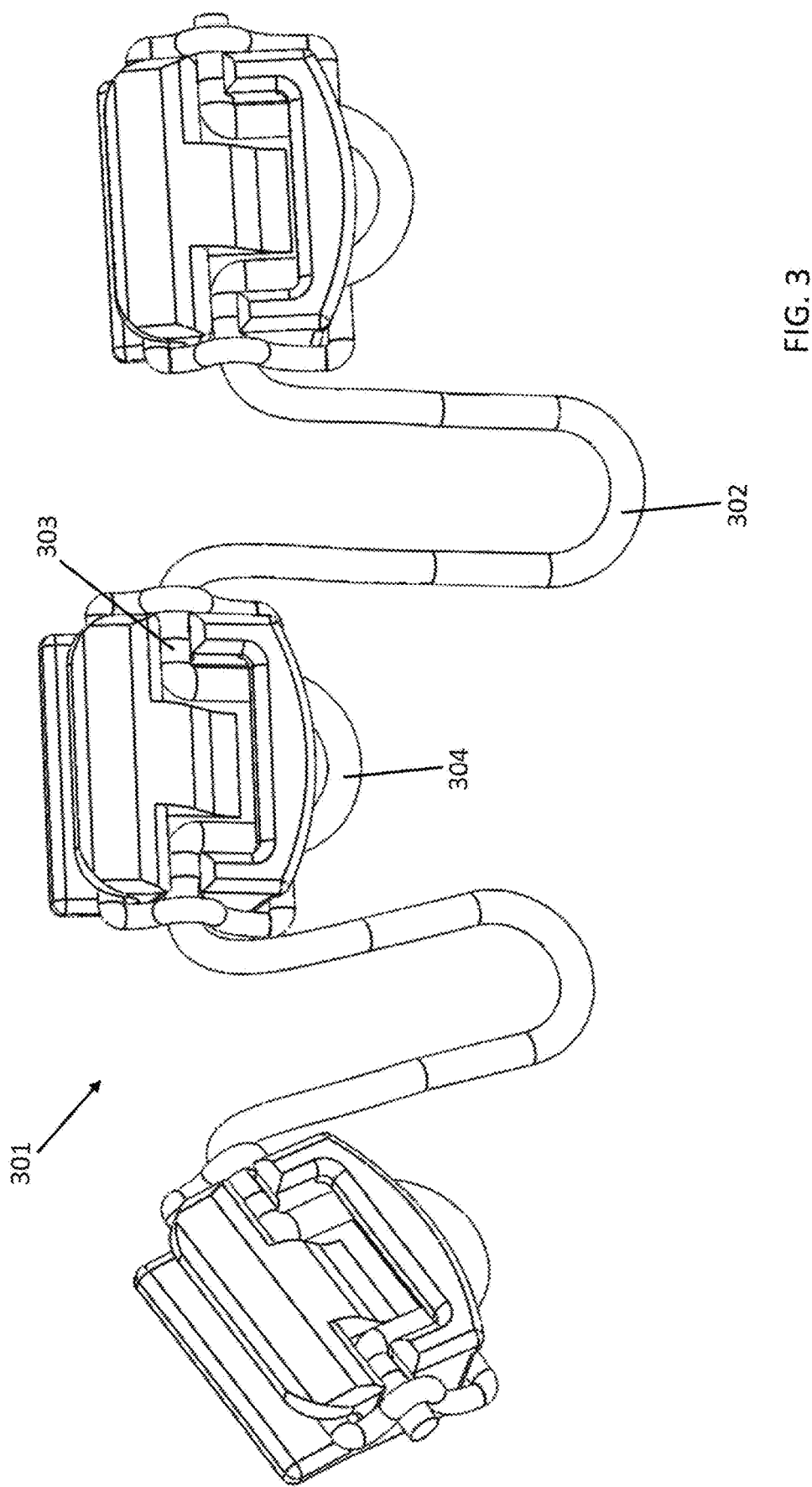
FIG. 3 illustrates an angled view of an orthodontic archwire with interproximal loops tied to three orthodontic brackets configured to be inserted from the gingival direction.

FIG. 3 illustrates a 3-tooth segment of an orthodontic appliance system 301. In some embodiments, the system 301 can include all of the upper and/or lower teeth of a dental arch. The archwire includes the interproximal structures, e.g., loops 302, archwire legs 303, and the male fastener 304, which is illustrated in this figure as a U-shaped loop. Orthodontic appliances comprising multiple brackets can include brackets of the same or various configurations. Likewise, archwires used in orthodontic appliances can include male fasteners of the same or various different configurations. In this illustration, U-shaped interproximal loops 302 are displayed pointing toward the gingival direction. The interproximal loops 302 may be configured in any shape or bend such as, for example, U, T, boot, rectangular, teardrop, or triangular shaped, or combinations of the foregoing. The interproximal loops 302 may be oriented in either the gingival or occlusal direction, for example. The interproximal loops 302 may be configured for exerting forces on the adjacent brackets 301, designed to correct the positioning of the teeth. For example, the archwire may comprise a shape memory alloy, such as nickel-titanium, which is biased toward a corrective configuration. The interproximal loops 302 of a shape memory alloy may be used to exert forces on the mesial and distal archwire legs 303 of each bracket 301 independent of the forces exerted on the other side of the bracket or of the forces exerted on other brackets in the orthodontic appliance. Because the brackets 301 can rely on non-sliding mechanics, the forces on opposite sides of a single bracket 301 can be more readily configured. The interproximal loops 302 may be configured to exert any number of a medial, distal, occlusal, gingival, buccal, and/or lingual force on each side (mesial and distal) of the bracket or combinations thereof. As described elsewhere herein, in many embodiments by selectively modulating the direction of force applied to each side of a bracket 301, a translational force and/or torque force can be applied to the bracket and underlying tooth. Many of the embodiments disclosed herein, allow effective control of the application of a translational force or torque to the brackets in three-dimensions.

Figure 4:
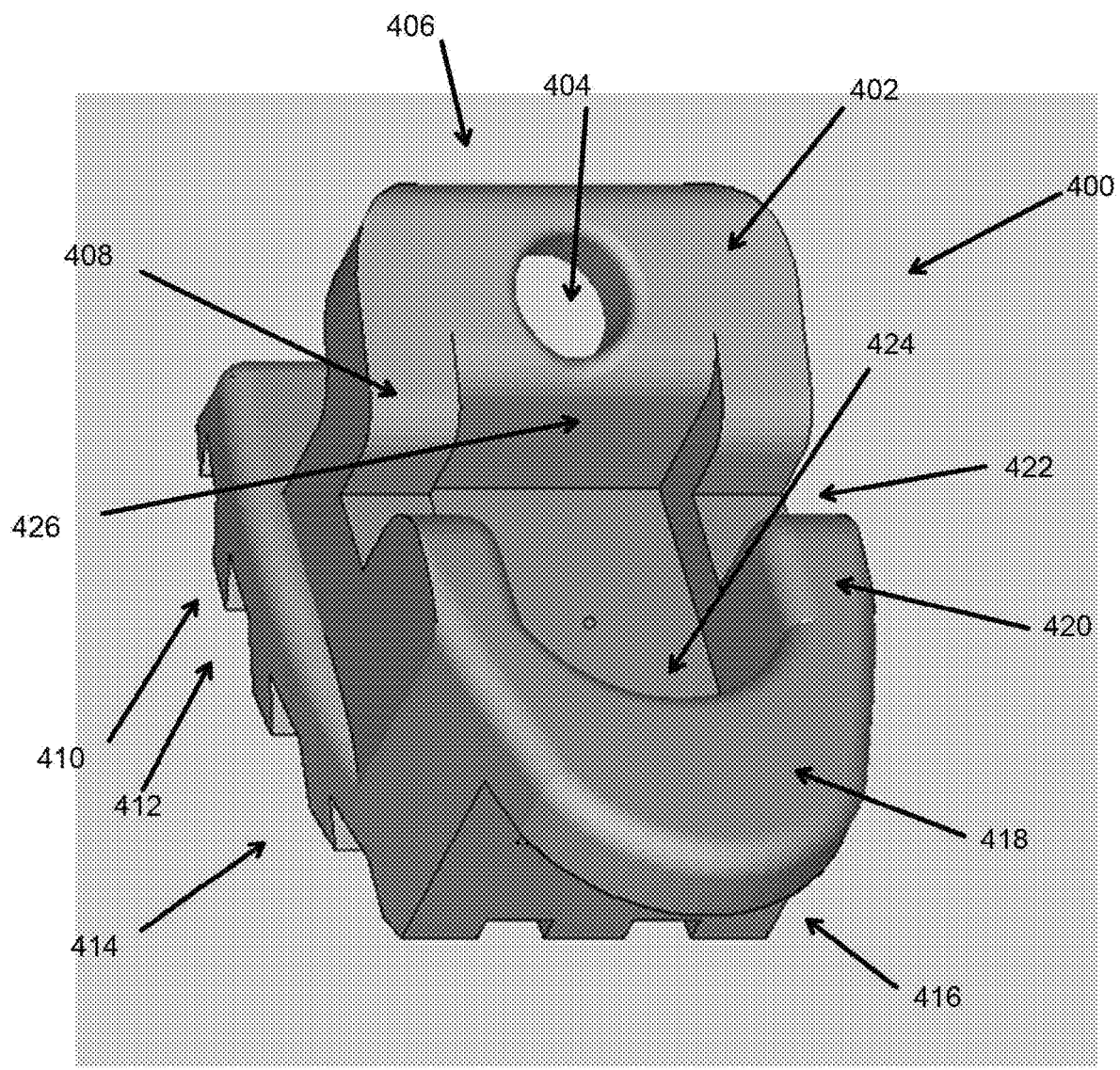
FIG. 4 illustrates an angled view of an embodiment of an orthodontic bracket comprising an eyelet in the incisal tie wing for anchoring a tie and feet on the tooth-facing surface of the base.

FIG. 4 illustrates another example of an orthodontic bracket 400. The bracket 400 may include a base having a tooth-facing side and a non-tooth-facing side 414; an incisal tie wing 402 having an incisal-most edge 406, an incisal-facing surface 424, and legs 408; a gingival tie wing 418 having a gingival-most edge 416, a gingival-facing surface 426, and legs 420; and an archwire slot 422. The bracket 400 can generally have the same or similar features as described elsewhere herein. As shown in FIG. 4, the incisal tie wing 402 comprises an aperture or eyelet 404. One or both of the tie wings 402, 418 may comprise an eyelet 404. The eyelet 404 may be positioned in the bridge of the tie wing 402. The eyelet 402 may be generally circular or may have another shape. The eyelet 402 may be configured to serve as an anchor element. The tie wing 402 can allow ties to be anchored to the bracket through the eyelet 402. For example, the ends of a non-continuous tie can be inserted through the eyelet 402 from the tooth-facing side of the base after being tied around the bracket 400 and over the archwire and tied on the non-tooth facing side 414. The brackets disclosed herein may further optionally include feet or protrusions 410 and voids 412 surrounding the feet 410 on the tooth-facing side of the base or other types of textured surfaces. The feet 410 may extend generally perpendicular to the tooth-facing surface and may comprise generally flat ends. The feet 410 may comprise any proportion of the surface area of the tooth-facing surface (e.g., at least about, about, or no more than about 10%, 20%, 30%, 40%, 50%, 60%, 70%, 80%, 90%, etc.). These feet 410 or textured surfaces may increase surface area of the tooth-facing side of the base, allowing increased retention of bonding adhesive, and can be used to improve bonding to the surface of the tooth.

The archwire may be configured to insert the male fasteners 304 from either the gingival or occlusal direction. The embodiments described herein generally describe the disclosed brackets as receiving the male fasteners 304 such that the loop points in a gingival direction. However, the brackets may be applied to the teeth in any orientation, for example, such that the loops of the male fasteners 304 point toward the occlusal direction. The gingival and incisal tie wings may also be switched. In some embodiments, the gingival and incisal tie wings may be shaped similarly or identically to each other. In some embodiments, the bracket may be symmetrical, including the gingival and occlusal halves and the mesial and distal halves. For example, both the gingival and occlusal tie wings may comprise slots that allow for the insertion of male fastener giving the practitioner a choice in the direction of insertion after the bracket is already bonded to the tooth. The interproximal loops 302 can be present, but are not required between every adjacent male fastener 304, and a straight wire may be used instead. The interproximal loops 302 may be placed close to but not touching the gingiva, or extend past the base of the tooth proximate the gingiva in some embodiments. The embodiments of brackets disclosed herein may generally comprise a thin anterior-superior profile in some embodiments. The two-dimensional embodiments of male fasteners wherein the archwire is bent within a single plane allow simple engagement of the male fastener with the bracket in a low-profile configuration. For example, the thickness of the bracket may be substantially equivalent to the thickness of the base, the archwire, and the superficial surface of the gingival tie bracket combined, or about or at least about 1×, 1.1×, 1.2×, 1.3×, 1.4×, 1.5×, 1.6×, 1.7×, 1.8×, 1.9×, 2×, 2.5×, 3× or more than the thickness of the respective combined elements in some embodiments. Some brackets may be especially well configured for, in some cases, bonding to lingual and/or anterior teeth. The brackets may be designed with larger profiles as well. For example, a larger profile may allow more room for the archwire to bend toward the tooth as it exits the bracket and apply a force in the direction of the tooth (e.g., lingual or buccal depending on which side of the tooth the bracket is attached).

The male fasteners disclosed herein may be inserted into the brackets disclosed herein according to any suitable means. In some implementations, the archwires, including the male fasteners and/or archwire legs, may be inserted into the bracket using a suitable orthodontic tool. In some implementations, the orthodontist may insert the archwires, including the male fasteners and/or archwire legs, into the bracket manually, for example, using his or her fingers. In some embodiments, the male fasteners may be configured to form a tight interference fit with the bracket slots and/or channels, in which case they may snap into place and remain relatively engaged with the bracket after snapping into place. In some embodiments, the male fastener and bracket may be configured to have some additional room which allows the free insertion and/or removal of the male fastener from the bracket without the application of any substantial force.

In various embodiments, the male fastener engages a bracket channel. The male fastener may be configured to slide into the channel without any compression of the loop portion of the male fastener. In some embodiments, the loop may be elastically or non-elastically deformed as it engages the channel, which may promote a secure engagement with the bracket. The loop of the faster may be compressed as it is impressed into the channel by the compressive counter forces of the channel walls. In some embodiments, such as illustrated herein, the channel walls may be substantially parallel to one another and/or substantially perpendicular to the archwire legs and/or bracket slot. In some embodiments, the channel walls may be angled. For example, the width between the mesial and distal channel walls may decrease toward the gingival end of the channel, which may provide increasing compressive force as the male fastener is inserted deeper into the channel. In some implementations, the orthodontist may manually adjust the width of the loop using his or her fingers or a tool, prior to or during insertion of the male fastener into the bracket. The male fasteners may be configured to slide into the channel at an angle relative to its seated configuration. For example, the orthodontist may aim the projection of the male fastener substantially toward the base of the bracket and rotate the male fastener (e.g., in a gingival direction) as he or she slides it into the bracket channel. The recess in the gingival bracket tie may be configured to allow sufficient angling of the male fastener as it is inserted into the channel. In some implementations, the male fastener may be elastically or non-elastically bent out of plane with the archwire ties during insertion. The male fastener may be restored, naturally or manually, to its original configuration after insertion into the channel. The tie may be applied to the bracket according to any suitable procedure after insertion of the male fastener. The tie may provide some amount of friction to the archwire legs which facilitates in restricting lateral movement or sliding of the archwire legs. The tie may also restrict rotation of the archwire and male fastener around the mesial-distal axis of the archwire. In various implementations, the male fastener is readily removable from the bracket, for example, by reversing the procedure used to insert the male fastener.

Various other modifications, adaptations, and alternative designs are of course possible in light of the above teachings. For example, features disclosed in U.S. Pub. No. 2014/0120491 A1 to Khoshnevis et al. can be utilized or modified or use with embodiments as disclosed herein. Therefore, it should be understood at this time that within the scope of the appended claims the invention may be practiced otherwise than as specifically described herein. It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. For example, actions such as "tying a tie onto an orthodontic bracket" includes "instructing the tying of a tie onto an orthodontic bracket." The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

What is claimed is:

1. An orthodontic appliance comprising:
   a plurality of orthodontic brackets, each of the plurality of orthodontic brackets configured to be coupled to a tooth of a patient and comprising:
      a mesial wall and distal wall with a channel disposed therebetween;
      a stop disposed on a gingival end of the orthodontic bracket, the stop having an occlusal-facing wall and a rigid projection, the occlusal-facing wall comprising a mesial sidewall and a distal sidewall, the rigid projection extending occlusally of the mesial and distal sidewalls of the occlusal-facing wall into the channel, the mesial and distal sidewalls of the occlusal-facing wall disposed gingivally of the mesial wall and the distal wall; and
      a mesial slot and a distal slot, the mesial slot extending longitudinally in a mesial-distal direction, open in a mesial direction, and disposed between the mesial wall and the mesial sidewall of the occlusal-facing wall of the stop in an occlusal-gingival direction such that the mesial slot is occlusal of the mesial sidewall of the occlusal-facing wall of the stop and gingival of the mesial wall, and the distal slot extending longitudinally in the mesial-distal direction, open in a distal direction, and disposed between the distal wall and the distal sidewall of the occlusal-facing wall of the stop in the occlusal-gingival direction such that the distal slot is occlusal of the distal sidewall of the occlusal-facing wall of the stop and gingival of the distal wall;
   an archwire configured to engage with the plurality of orthodontic brackets to move teeth of the patient, the archwire comprising:
      a plurality of male fasteners, each of the plurality of male fasteners comprises a mesial leg, a distal leg, and a portion defining an opening, the portion configured to be disposed in the channel of one of the plurality of orthodontic brackets such that the rigid projection is positioned within the opening and the portion defining the opening surrounds at least part of the rigid projection, the mesial leg configured to be disposed in the mesial slot such that the mesial leg is occlusal of the mesial sidewall of the occlusal-facing wall of the stop and gingival of the mesial wall and the distal leg configured to be disposed in the distal slot such that the distal leg is occlusal of the distal sidewall of the occlusal-facing wall of the stop and gingival of the distal wall; and
      a plurality of interproximal loops, each of the plurality of interproximal loops disposed between a pair of male fasteners of the plurality of male fasteners.

2. The orthodontic appliance of claim 1, wherein the plurality of male fasteners do not slide with respect to the plurality of orthodontic brackets when engaged.

3. The orthodontic appliance of claim 2, wherein the mesial and distal walls prevent mesial-distal movement of the plurality of male fasteners.

4. The orthodontic appliance of claim 1, wherein the plurality of interproximal loops extend in a gingival direction.

5. The orthodontic appliance of claim 1, wherein the channel is open in an occlusal direction.

6. The orthodontic appliance of claim 5, wherein the archwire is engaged with the plurality of orthodontic brackets, and wherein the plurality of male fasteners are configured to extend in the occlusal direction beyond the mesial and distal walls.

7. An orthodontic appliance comprising:
   a plurality of orthodontic brackets, each of the plurality of orthodontic brackets configured to be coupled to a tooth of a patient and comprising:

a mesial wall and a distal wall with a channel disposed therebetween;

a stop disposed on a gingival side of the orthodontic bracket, the stop comprising:

an occlusal-facing wall comprising a mesial sidewall and a distal sidewall; and a portion that extends occlusally of the mesial and distal sidewalls of the occlusal-facing wall in an occlusal direction toward the channel disposed between the mesial and distal walls and occlusally of the mesial and distal sidewalls of the occlusal-facing wall, the mesial and distal sidewalls of the occlusal-facing wall disposed gingivally of the mesial wall and the distal wall; and a mesial slot and a distal slot, the mesial slot disposed between the mesial wall and the mesial sidewall of the occlusal-facing wall of the stop in an occlusal-gingival direction and the distal slot disposed between the distal wall and distal sidewall of the occlusal-facing wall of the stop in the occlusal-gingival direction;

an archwire configured to engage with the plurality of orthodontic brackets to move teeth of the patient, the archwire comprising:

a plurality of male fasteners, each of the plurality of male fasteners comprises a recess and is configured to be disposed in the channel of one of the plurality of orthodontic brackets such that the portion of the stop that extends in the occlusal direction is positioned within the recess of the male fastener; and a plurality of interproximal loops extending in a gingival direction, each of the plurality of interproximal loops disposed between a pair of male fasteners of the plurality of male fasteners;

wherein portions of the archwire are configured to be disposed in the mesial slot and the distal slot of each of the plurality of orthodontic brackets such that the portions are simultaneously occlusal of the mesial and distal sidewalls of the occlusal-facing wall of the stop and gingival of the mesial wall or the distal wall.

8. The orthodontic appliance of claim 7, wherein the plurality of male fasteners do not slide with respect to the plurality of orthodontic brackets when engaged.

9. The orthodontic appliance of claim 8, wherein the mesial and distal walls prevent mesial-distal movement of the plurality of male fasteners.

10. The orthodontic appliance of claim 7, wherein the plurality of interproximal loops define gaps along the archwire.

11. The orthodontic appliance of claim 7, wherein the plurality of interproximal loops are open in the occlusal direction.

12. The orthodontic appliance of claim 7, wherein the portion of the stop that extends in the occlusal direction is rigid.

13. The orthodontic appliance of claim 7, wherein the channel is open in the occlusal direction.

14. The orthodontic appliance of claim 7, wherein the archwire is engaged with the plurality of orthodontic brackets, and wherein the plurality of male fasteners extend in the occlusal direction beyond the mesial and distal walls.

15. The orthodontic appliance of claim 7, wherein the portions of the archwire comprise a mesial leg and a distal leg of each of the plurality of male fasteners.

* * * * *